United States Patent
Kudoh et al.

(10) Patent No.: US 9,531,317 B2
(45) Date of Patent: Dec. 27, 2016

(54) POWER CONVERSION APPARATUS, POWER CONVERSION METHOD, AND MOTOR SYSTEM

(71) Applicant: Panasonic Intellectual Property Management Co., Ltd., Osaka (JP)

(72) Inventors: Yuji Kudoh, Kyoto (JP); Kenji Mizutani, Kyoto (JP); Nobuyuki Otsuka, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/761,542

(22) PCT Filed: Jan. 10, 2014

(86) PCT No.: PCT/JP2014/000081
§ 371 (c)(1),
(2) Date: Jul. 16, 2015

(87) PCT Pub. No.: WO2014/115498
PCT Pub. Date: Jul. 31, 2014

(65) Prior Publication Data
US 2015/0333689 A1     Nov. 19, 2015

(30) Foreign Application Priority Data

Jan. 25, 2013    (JP) ................................. 2013-012361

(51) Int. Cl.
*H02M 5/293*      (2006.01)
*H02P 27/16*      (2006.01)
(Continued)

(52) U.S. Cl.
CPC .............. *H02P 27/16* (2013.01); *H02M 5/293* (2013.01); *H02M 5/297* (2013.01); *H02P 27/045* (2013.01);
(Continued)

(58) Field of Classification Search
CPC ........ H02M 5/293; H02M 5/297; H02P 27/16; H02P 27/045
See application file for complete search history.

(56) References Cited

U.S. PATENT DOCUMENTS

| 5,483,139 A | * | 1/1996 | Welles, II | ............... H02P 25/04 |
|---|---|---|---|---|
| | | | | 318/782 |
| 7,274,579 B2 | * | 9/2007 | Ueda | ..................... H02M 5/458 |
| | | | | 363/125 |

(Continued)

FOREIGN PATENT DOCUMENTS

| JP | 46-39182 | 11/1971 |
|---|---|---|
| JP | 60-200767 | 10/1985 |

(Continued)

OTHER PUBLICATIONS

International Search Report issued Mar. 25, 2014 in International Application No. PCT/JP2014/000081.

*Primary Examiner* — Shawki S Ismail
*Assistant Examiner* — Muhammad S Islam
(74) *Attorney, Agent, or Firm* — Wenderoth, Lind & Ponack, L.L.P.

(57) ABSTRACT

An efficient and reliable power conversion method for converting an input voltage which is a single-phase AC voltage into output voltages forming a two-phase AC voltage includes: receiving an input voltage; designating, as a first target voltage representing consecutive target values of a first-phase output voltage and a second target voltage representing consecutive target values of a second-phase output voltage, AC voltages forming a two-phase AC voltage and having (i) an amplitude $1/\sqrt{2}$ times smaller than an amplitude of the input voltage, and (ii) phase differences of +45 degrees and −45 degrees relative to the input voltage; and designating a frequency other than a frequency twice a frequency of the input voltage, as a frequency of the first target voltage and the second target voltage.

16 Claims, 25 Drawing Sheets

(51) Int. Cl.
*H02P 27/04* (2016.01)
*H02M 5/297* (2006.01)

(52) U.S. Cl.
CPC .. *H02M 2005/2932* (2013.01); *H02P 2207/01* (2013.01); *H02P 2209/05* (2013.01)

(56) References Cited

U.S. PATENT DOCUMENTS

| | | |
|---|---|---|
| 8,941,350 B2 | 1/2015 | Otsuka et al. |
| 2006/0097687 A1* | 5/2006 | Byrnes ..................... H02P 1/44 318/751 |
| 2011/0199016 A1* | 8/2011 | Rinaldi ................. H02M 5/293 315/291 |
| 2012/0001577 A1* | 1/2012 | Furuta ..................... B23H 7/14 318/436 |
| 2013/0307463 A1 | 11/2013 | Otsuka et al. |

FOREIGN PATENT DOCUMENTS

| | | |
|---|---|---|
| JP | 5-115199 | 5/1993 |
| JP | 7-46803 | 2/1995 |
| JP | 2000-232785 | 8/2000 |
| JP | 2010-68606 | 3/2010 |
| JP | 2010-154714 | 7/2010 |
| JP | 2011-4449 | 1/2011 |
| JP | 2011-45191 | 3/2011 |
| WO | 2013/132538 | 9/2013 |

* cited by examiner

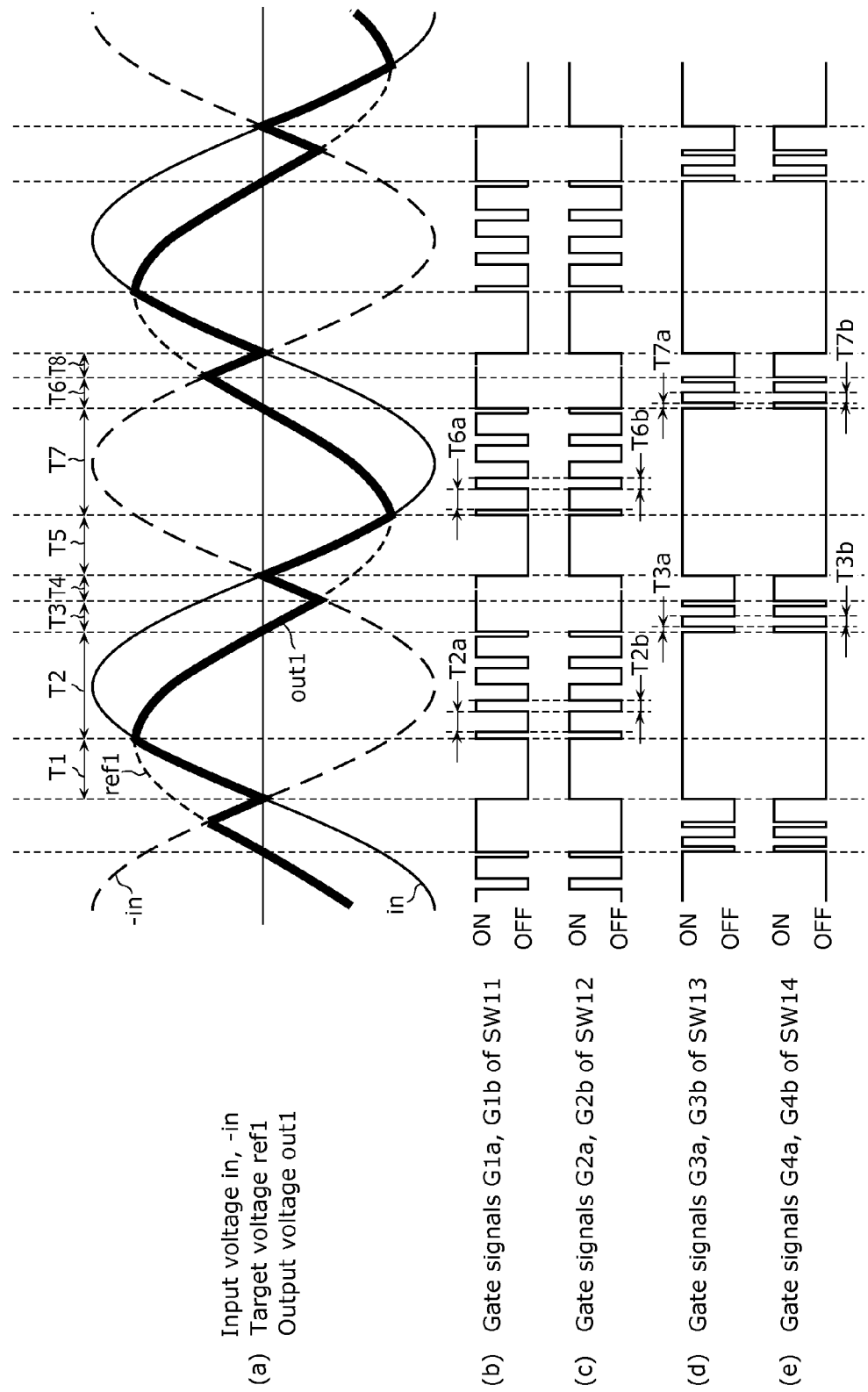

Time periods T1, T2a

Time period T2b

Time periods T3a, T4

Time period T3b

Time periods T5, T6a

Time period T6b

Time periods T7a, T8

Time period T7b

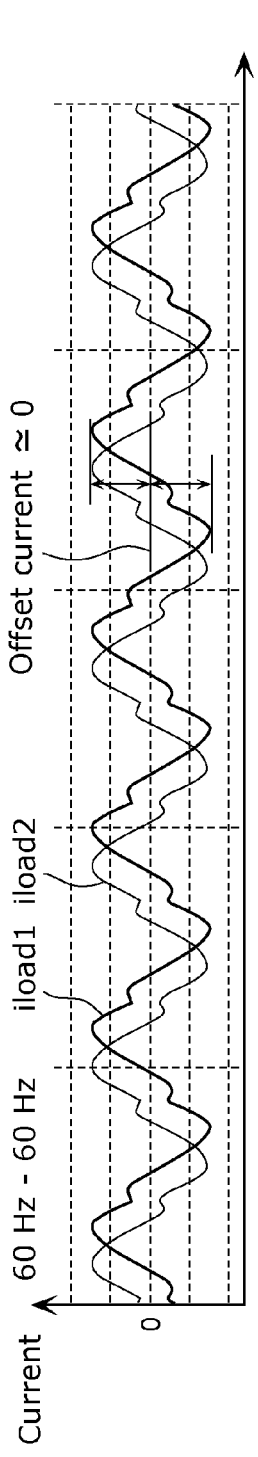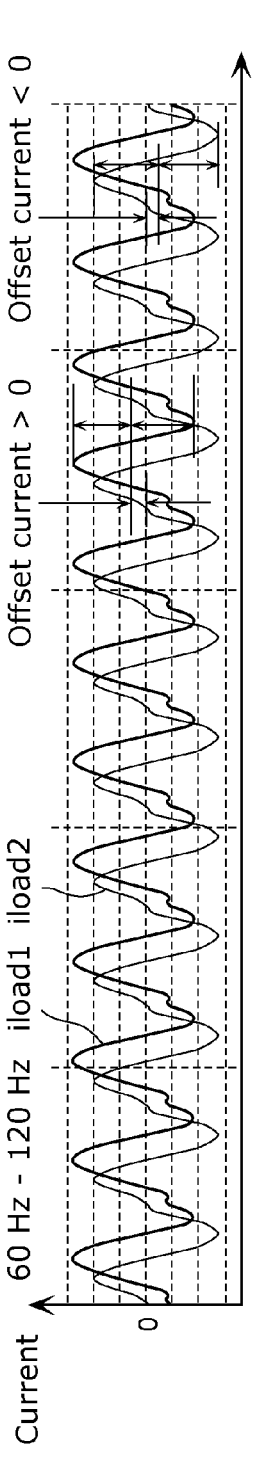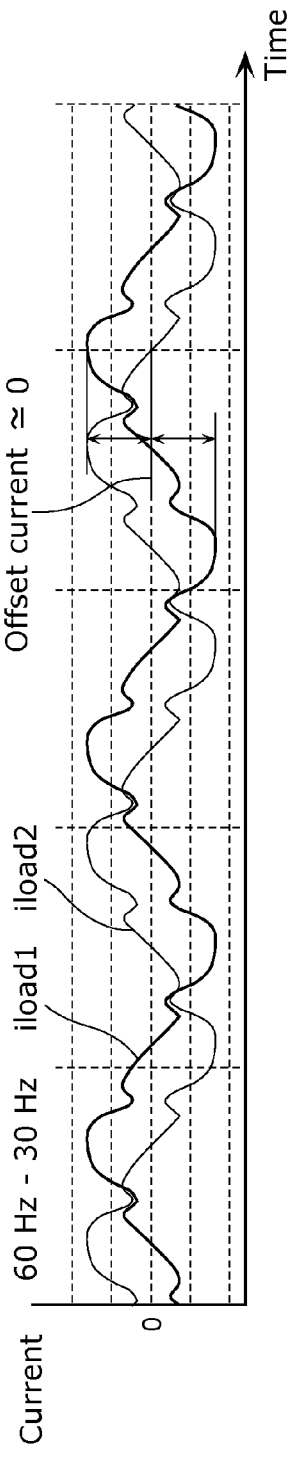

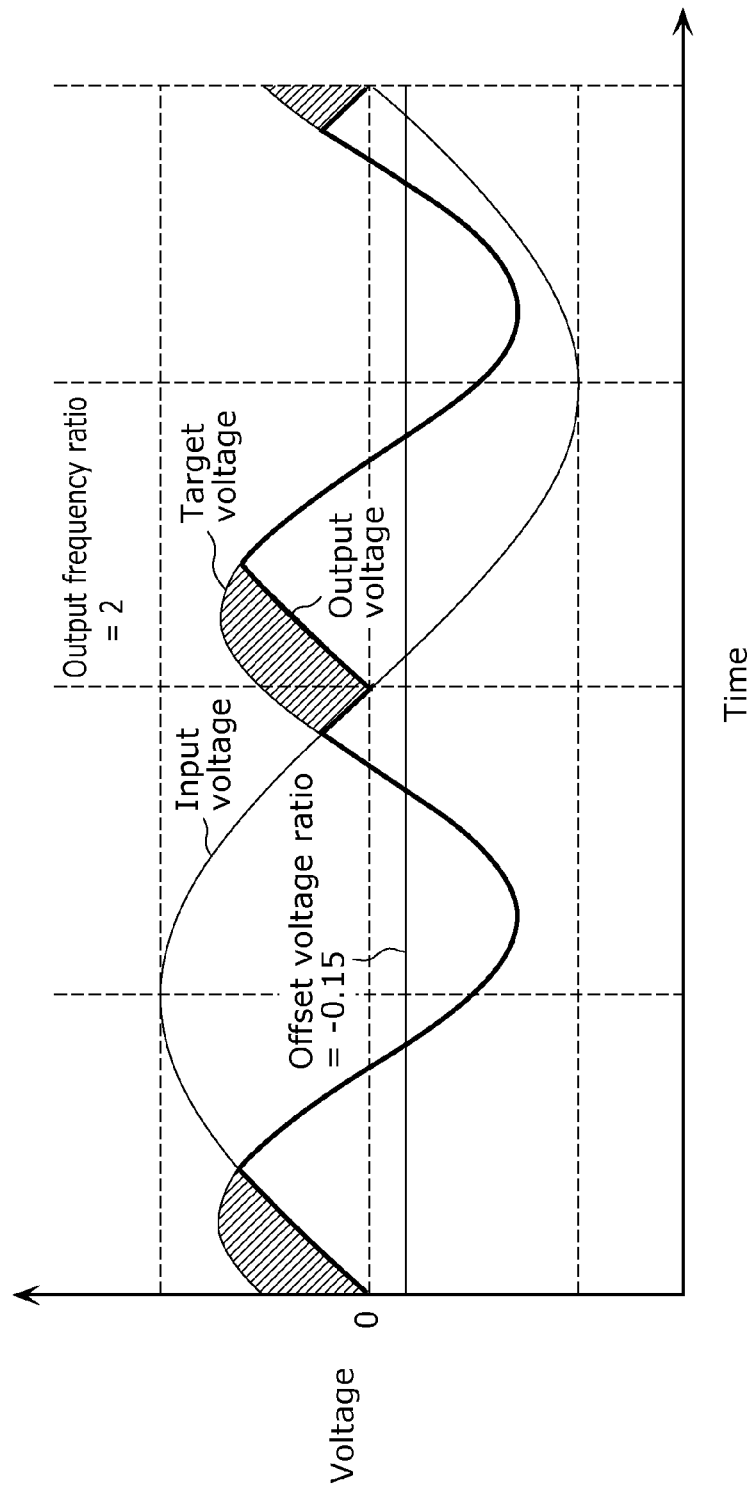

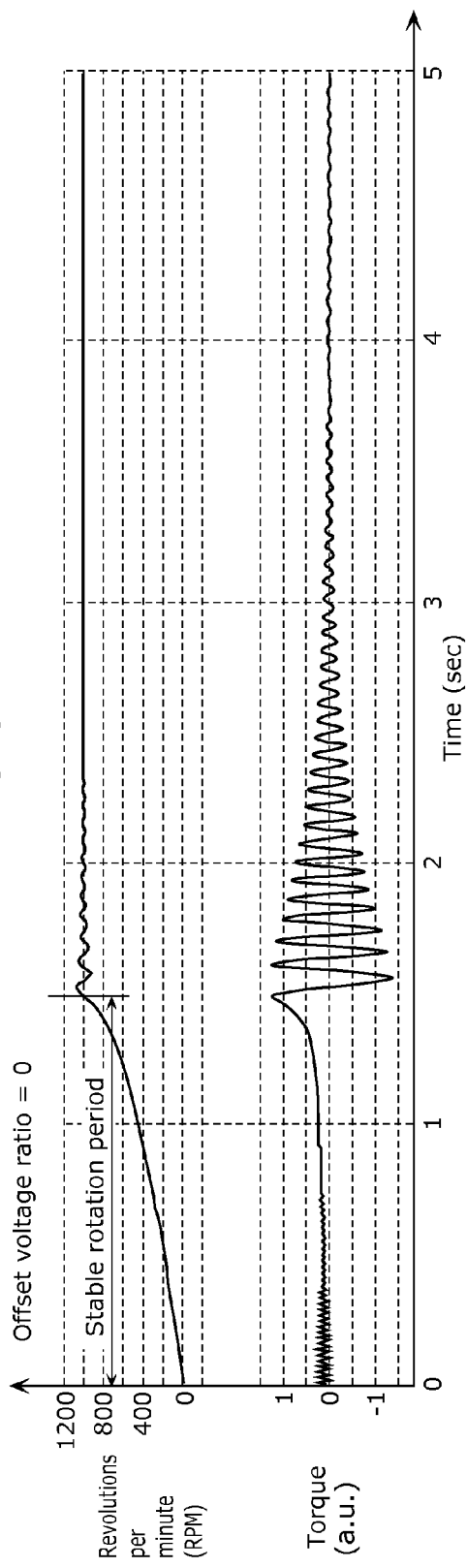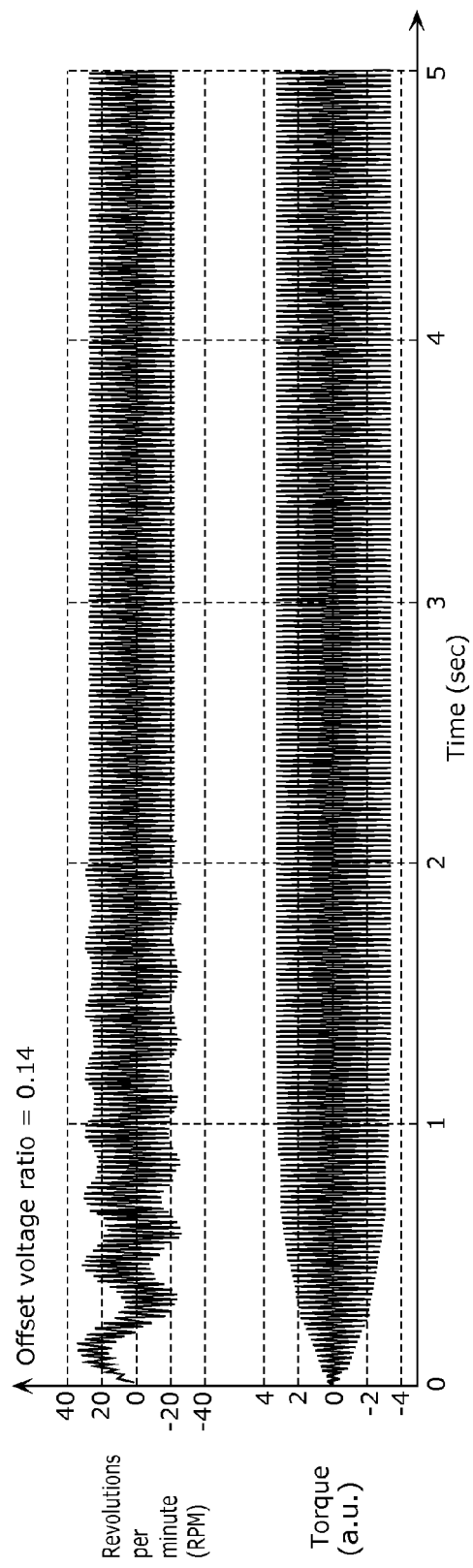

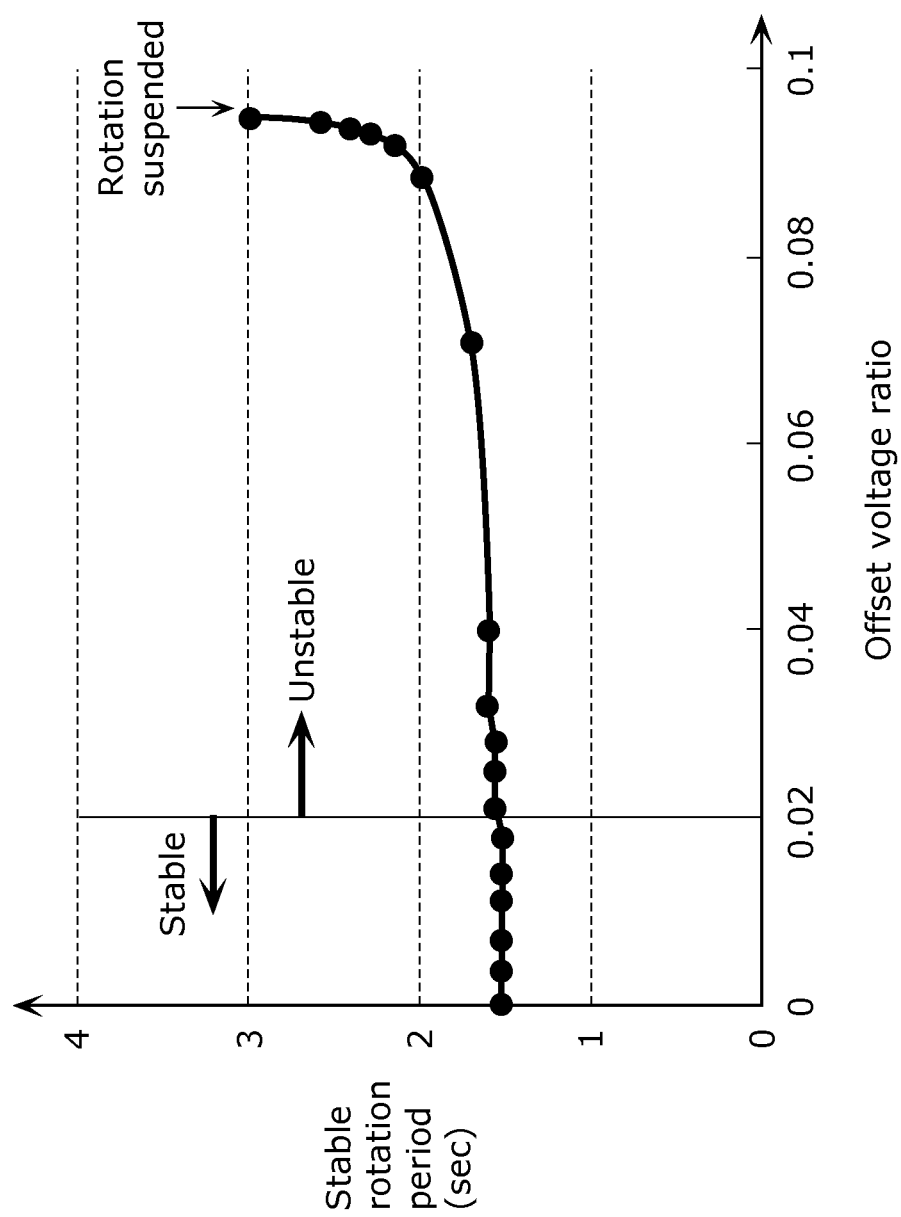

POWER CONVERSION APPARATUS, POWER CONVERSION METHOD, AND MOTOR SYSTEM

TECHNICAL FIELD

The present invention relates to a power conversion apparatus and a power conversion method, and particularly relates to a technique of converting single-phase AC power into two-phase AC power and a motor system which drives a two-phase induction motor using two-phase AC power obtained by converting single-phase AC power using such a technique.

BACKGROUND ART

Conventionally, power conversion apparatuses including a matrix converter have been in practical use (see Patent Literature (PTL) 1 and PTL 2, for example).

FIG. 21 is a circuit diagram of a matrix converter 200 disclosed in PTL 1. To drive a three-phase motor 203 using a single-phase AC power supply 201, the matrix converter 200 directly converts an input AC voltage supplied from the single-phase AC power supply 201 into a three-phase output AC voltage using bidirectional switches 202a to 202f, and supplies the output AC voltage of each phase to a winding of a corresponding phase of the three-phase motor 203.

Each of the bidirectional switches 202a to 202f includes two switching elements connected in inverse parallel, each capable of changing between a unidirectional conducting state and a non-conducting state. A magnitude determining unit 204 determines the magnitude relationship between the voltages at the terminals of the single-phase AC power supply 201. According to the magnitude relationship determined by the magnitude determining unit 204, a control unit 205 supplies a current to the windings of the three-phase motor 203 from the single-phase AC power supply 201, and controls the conduction of each of the bidirectional switches 202a to 202f to allow circulation of a regenerative current from the windings of the three-phase motor 203.

According to PTL 1, the matrix converter 200 having the above configuration allows the motor driving current to be stable, highly efficient, and highly reliable.

PTL 2 discloses a similar technique for driving a three-phase motor with a single-phase AC power supply, using a matrix converter.

For home appliances, a two-phase motor is often used as it is simple in configuration and favorable for miniaturization compared to the three-phase motor. Most of the two-phase motors that operate from a household single-phase AC power supply are capacitor motors which generate a rotating magnetic field for a start-up, by applying a two-phase AC voltage generated from the single-phase AC power supply using a capacitor to a main winding and an auxiliary winding (see PTL 3, for example).

FIG. 22 is a circuit diagram of a capacitor motor 300 disclosed in PTL 3, illustrating a typical example of connection of windings 302 and 303, a capacitor 304, and an AC power supply 301. PTL 3 discloses a technique of switching among a plurality of rotation speeds of the capacitor motor by simply changing the connection of the capacitor, the windings, and the AC power supply, without a need to add a center tap for the windings or an external reactor.

CITATION LIST

Patent Literature

[PTL 1] Japanese Unexamined Patent Application Publication No. 2011-4449
[PTL 2] Japanese Unexamined Patent Application Publication No. 2010-154714
[PTL 3] Japanese Unexamined Patent Application Publication No. 7-46803

SUMMARY OF INVENTION

Technical Problem

However, the lifespan of the motor in the capacitor motor is limited by the capacitor's lifespan. Conventionally, a single-phase motor which does not include a capacitor has been used in some cases; however, the range of application of the single-phase motor is limited compared to the capacitor motor because the single-phase motor cannot generate the rotating magnetic field for a start-up, thus not allowing unique determination of the rotor's rotating direction and readily causing torque pulsation.

The present invention has been conceived in view of the above circumstance, it is an object of the present invention to provide: a power conversion apparatus and a power conversion method for converting a single-phase AC voltage into a two-phase AC voltage without using a capacitor; and a motor system which includes such a power conversion apparatus and stably rotates a two-phase motor at a variable number of revolutions per minute (rpm).

Solution to Problem

To solve the above problems, a power conversion method according to an aspect of the present invention is a power conversion method performed by a power conversion apparatus which converts an input voltage which is a single-phase AC voltage into output voltages forming a two-phase AC voltage, the power conversion apparatus including: a pair of input terminals to which the input voltage is applied; a pair of first output terminals which output one of the output voltages as a first-phase output voltage; a pair of second output terminals which output the other of the output voltages as a second-phase output voltage; four first bidirectional switches each corresponding to a different combination of one of the paired input terminals and one of the paired first output terminals to switch connection and disconnection between the corresponding input terminal and first output terminal according to a corresponding one of first control signals; four second bidirectional switches each corresponding to a different combination of one of the paired input terminals and one of the paired second output terminals to switch connection and disconnection between the corresponding input terminal and second output terminal according to a corresponding one of second control signals; a target voltage designating unit configured to designate a first target voltage representing, using one of AC voltages forming a two-phase AC voltage, consecutive target values of the first-phase output voltage and a second target voltage representing, using the other of the AC voltages forming the two-phase AC voltage, consecutive target values of the second-phase output voltage; a target frequency designating unit configured to designate a frequency of the first target voltage and the second target voltage; a control signal generating unit configured to (i) generate the first control signals to cyclically connect and disconnect the pair of the input terminals and the pair of the first output terminals via the first bidirectional switches at a duty cycle corresponding to a ratio of an instantaneous absolute value of the first target voltage to an instantaneous absolute value of the input voltage during a time period in which the instantaneous absolute value of the input voltage is greater than the instantaneous absolute value of the first target voltage, and (ii) generate the second control signals to cyclically connect and disconnect the pair of the input terminals and the pair of the second output terminals via the second bidirectional switches at a duty cycle corresponding to a ratio of an instantaneous absolute value of the second target voltage to the instantaneous absolute value of the input voltage during a time period in which the instantaneous absolute value of the input voltage is greater than the instantaneous absolute value of the second target voltage; and a driver which supplies the generated first control signals to the first bidirectional switches and the generated second control signals to the second bidirectional switches, the power conversion method including: designating, using the target voltage designating unit, AC voltages as the first target voltage and the second target voltage, the AC voltages forming a two-phase AC voltage and having (i) an amplitude $1/\sqrt{2}$ times smaller than an amplitude of the input voltage, and (ii) phase differences of +45 degrees and −45 degrees relative to the input voltage; and designating, using the target frequency designating unit, a frequency other than a frequency twice a frequency of the input voltage, as the frequency of the first target voltage and the second target voltage.

Advantageous Effects of Invention

According to the power conversion method having the configuration as described, a single-phase AC voltage can be converted into a two-phase AC voltage through the switching operations of the bidirectional switches. As a result, a two-phase AC voltage can be efficiently generated from a single-phase AC voltage without using a smoothing capacitor which may damage the long-term reliability of the apparatus.

Furthermore, according to the power conversion method, the two-phase AC voltage can be generated at, as the frequency of the two-phase AC voltage, frequencies excluding a frequency identified in advance as a frequency at which the two-phase AC voltage includes an offset voltage greater than or equal to a predetermined value. That is to say, the two-phase AC voltage which does not include the offset voltage greater than or equal to the predetermined value can be generated at a frequency arbitrarily selected from among a plurality of frequencies. An example of the excluded frequency is a frequency twice the frequency of the input voltage. The two-phase AC voltage generated in this manner is suitable for stably rotating a two-phase motor at variable rpm and torque, for example.

A two-phase AC voltage generated from commercial power supply for households using the power conversion method may be supplied independently to the winding of each phase of a two-phase induction motor. This way, taking the advantage of the two-phase induction motor, i.e., simple in the manufacturing method and beneficial in miniaturization compared to a three-phase induction motor, it is possible to provide a broad range of home appliances with a highly reliable and long-life motor system which does not include a starting capacitor and has variable rpm and torque.

BRIEF DESCRIPTION OF DRAWINGS

FIG. 4 is a timing chart illustrating an example of gate signals of the power conversion apparatus.

FIG. 6A is a graph illustrating an example of winding currents resulted from a simulation of rotating a motor with output voltages generated by the power conversion apparatus.

FIG. 6B is a graph illustrating an example of winding currents resulted from a simulation of rotating a motor with output voltages generated by the power conversion apparatus.

FIG. 6C is a graph illustrating an example of winding currents resulted from a simulation of rotating a motor with output voltages generated by the power conversion apparatus.

FIG. 7 is a graph illustrating an example of waveforms of an input voltage, a target voltage, and an output voltage of the power conversion apparatus.

FIG. 8A is a graph illustrating an example of the revolutions per minute and torque of a motor as a result of simulation of rotating the motor with output voltages generated by the power conversion apparatus.

FIG. 8B is a graph illustrating an example of the revolutions per minute and torque of a motor as a result of simulation of rotating the motor with output voltages generated by the power conversion apparatus.

FIG. 9 is a graph illustrating an example of a relationship between a stable rotation period and an offset voltage ratio when a motor is rotated with output voltages generated by the power conversion apparatus.

DESCRIPTION OF EMBODIMENTS

Figure 1:
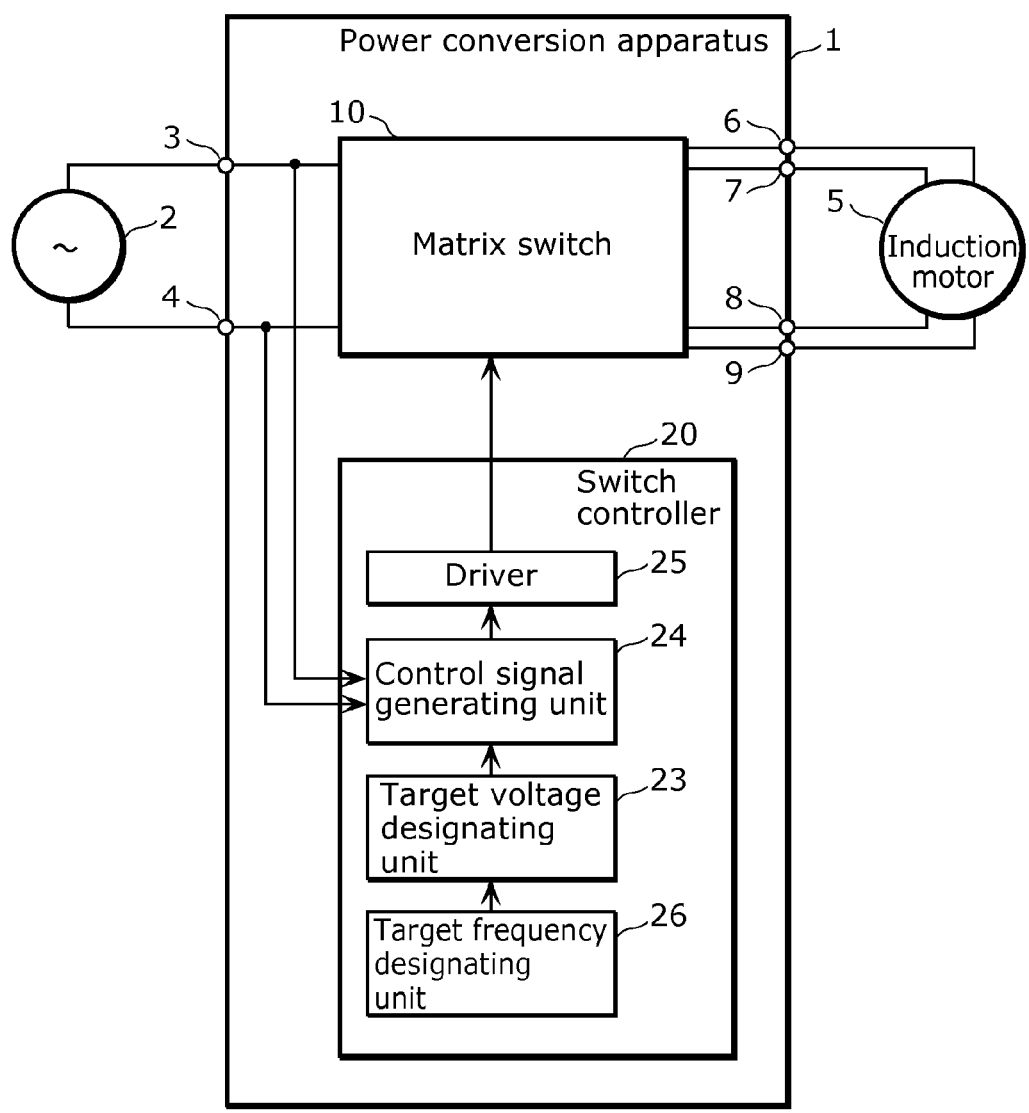
FIG. 1 is a block diagram illustrating an example of a functional configuration of a power conversion apparatus which performs a power conversion method and a motor system including such a power conversion apparatus according to Embodiment 1.

A power conversion method according to an aspect of the present invention is a power conversion method performed by a power conversion apparatus which converts an input voltage which is a single-phase AC voltage into output voltages forming a two-phase AC voltage, the power conversion apparatus including: a pair of input terminals to which the input voltage is applied; a pair of first output terminals which output one of the output voltages as a first-phase output voltage; a pair of second output terminals which output the other of the output voltages as a second-phase output voltage; four first bidirectional switches each corresponding to a different combination of one of the paired input terminals and one of the paired first output terminals to switch connection and disconnection between the corresponding input terminal and first output terminal according to a corresponding one of first control signals; four second bidirectional switches each corresponding to a different combination of one of the paired input terminals and one of the paired second output terminals to switch connection and disconnection between the corresponding input terminal and second output terminal according to a corresponding one of second control signals; a target voltage designating unit configured to designate a first target voltage representing, using one of AC voltages forming a two-phase AC voltage, consecutive target values of the first-phase output voltage and a second target voltage representing, using the other of the AC voltages forming the two-phase AC voltage, consecutive target values of the second-phase output voltage; a target frequency designating unit configured to designate a frequency of the first target voltage and the second target voltage; a control signal generating unit configured to (i) generate the first control signals to cyclically connect and disconnect the pair of the input terminals and the pair of the first output terminals via the first bidirectional switches at a duty cycle corresponding to a ratio of an instantaneous absolute value of the first target voltage to an instantaneous absolute value of the input voltage during a time period in which the instantaneous absolute value of the input voltage is greater than the instantaneous absolute value of the first target voltage, and (ii) generate the second control signals to cyclically connect and disconnect the pair of the input terminals and the pair of the second output terminals via the second bidirectional switches at a duty cycle corresponding to a ratio of an instantaneous absolute value of the second target voltage to the instantaneous absolute value of the input voltage during a time period in which the instantaneous absolute value of the input voltage is greater than the instantaneous absolute value of the second target voltage; and a driver which supplies the generated first control signals to the first bidirectional switches and the generated second control signals to the second bidirectional switches, the power conversion method including: designating, using the target voltage designating unit, AC voltages as the first target voltage and the second target voltage, the AC voltages forming a two-phase AC voltage and having (i) an amplitude $1/\sqrt{2}$ times smaller than an amplitude of the input voltage, and (ii) phase differences of +45 degrees and −45 degrees relative to the input voltage; and designating, using the target frequency designating unit, a frequency other than a frequency twice a frequency of the input voltage, as the frequency of the first target voltage and the second target voltage.

Furthermore, a frequency other than a frequency four times the frequency of the input voltage and a frequency other than a frequency six times the frequency of the input voltage may be designated as the frequency of the first target voltage and the second target voltage, using the target frequency designating unit.

According to such a power conversion method, it is possible to obtain: AC voltage output having less bias or distortion and no offset voltage when the single-phase AC power supply is converted into a two-phase AC power supply; and a power conversion method by which the motor can be stably driven.

A power conversion apparatus according to an aspect of the present invention is a power conversion apparatus which converts an input voltage which is a single-phase AC voltage into output voltages forming a two-phase AC voltage, the power conversion apparatus including: a pair of input terminals to which the input voltage is applied; a pair of first output terminals which output one of the output voltages as a first-phase output voltage; a pair of second output terminals which output the other of the output voltages as a second-phase output voltage; four first bidirectional switches each corresponding to a different combination of one of the paired input terminals and one of the paired first output terminals to switch connection and disconnection between the corresponding input terminal and first output terminal according to a corresponding one of first control signals; four second bidirectional switches each corresponding to a different combination of one of the paired input terminals and one of the paired second output terminals to switch connection and disconnection between the corresponding input terminal and second output terminal according to a corresponding one of second control signals; a target voltage designating unit configured to designate a first target voltage representing, using one of AC voltages forming a two-phase AC voltage, consecutive target values of the first-phase output voltage and a second target voltage representing, using the other of the AC voltages forming the two-phase AC voltage, consecutive target values of the second-phase output voltage; a target frequency designating unit configured to designate a frequency of the first target voltage and the second target voltage; a control signal generating unit configured to (i) generate the first control signals to cyclically connect and disconnect the pair of the input terminals and the pair of the first output terminals via the first bidirectional switches at a duty cycle corresponding to a ratio of an instantaneous absolute value of the first target voltage to an instantaneous absolute value of the input voltage during a time period in which the instantaneous absolute value of the input voltage is greater than the instantaneous absolute value of the first target voltage, and (ii) generate the second control signals to cyclically connect and disconnect the pair of the input terminals and the pair of the second output terminals via the second bidirectional switches at a duty cycle corresponding to a ratio of an instantaneous absolute value of the second target voltage to the instantaneous absolute value of the input voltage during a time period in which the instantaneous absolute value of the input voltage is greater than the instantaneous absolute value of the second target voltage; and a driver which supplies the generated first control signals to the first bidirectional switches and the generated second control signals to the second bidirectional switches, wherein the target voltage designating unit is configured to designate AC voltages as the first target voltage and the second target voltage, the AC voltages forming a two-phase AC voltage and having (i) an amplitude $1/\sqrt{2}$ times smaller than an amplitude of the input voltage, and (ii) phase differences of +45 degrees and −45 degrees relative to the input voltage, and the target frequency designating unit is configured to designate, as the frequency of the first target voltage and the second target voltage, a frequency other than a frequency twice a frequency of the input voltage.

Furthermore, the target frequency designating unit may be configured to designate, as the frequency of the first target voltage and the second target voltage, a frequency other than a frequency four times the frequency of the input voltage and a frequency other than a frequency six times the frequency of the input voltage.

According to such a power conversion apparatus, the same advantageous effect as that of the above-described power conversion method can be attained.

A motor system according to an aspect of the present invention is a motor system including: the above-described power conversion apparatus; a two-phase induction motor including: a first axis winding; a second axis winding; a rotor; a pair of first power receiving terminals connected to the first axis winding; and a pair of second power receiving terminals connected to the second axis winding, the first axis winding and the second axis winding being not electrically connected within the two-phase induction motor; first feed lines connecting the pair of the first output terminals of the power conversion apparatus and the pair of the first power receiving terminals of the two-phase induction motor; and second feed lines connecting the pair of the second output terminals of the power conversion apparatus and the pair of the second power receiving terminals of the two-phase induction motor.

According to such a motor system, it is possible to stably drive a long-life two-phase motor which does not include a starting capacitor, using a two-phase AC power supply obtained through conversion of a single-phase AC power supply by the power conversion apparatus.

With this motor system, the two-phase induction motor may further include a rotation angle sensor which outputs a rotation angle signal indicating consecutive rotation amounts of the rotor, the power conversion apparatus may further include a rotation angle obtaining unit configured to obtain the rotation angle signal, the target frequency designating unit may be configured to change the frequency of the first target voltage and the second target voltage based on a difference between a rotation speed of the rotor determined from the obtained rotation angle signal and a speed command value, and the target voltage designating unit may be configured to perform vector control to change the frequency of the first target voltage and the second target voltage according to the frequency designated by the target frequency designating unit, and further change at least one of an amplitude and a phase of the first target voltage and the second target voltage.

With this motor system, the power conversion apparatus may further include a current measuring unit configured to measure consecutive current amounts flowing in either the pair of the first output terminals or the pair of the second output terminals, the target frequency designating unit may be configured to estimate a rotation speed of the rotor using the measured consecutive current amounts, and change the frequency of the first target voltage and the second target voltage based on a difference between the estimated rotation speed and a speed command value, and the target voltage designating unit may be configured to perform speed sensorless vector control to change the frequency of the first target voltage and the second target voltage according to the frequency designated by the target frequency designating unit, and further change at least one of an amplitude and a phase of the first target voltage and the second target voltage.

According to such a configuration, it is possible to provide a motor system which can stably drive the motor.

Hereinafter, a power conversion apparatus, a power conversion method, and a motor system which includes such a power conversion apparatus according to an aspect of the present invention will be described in greater detail with reference to the accompanying drawings.

Each of the embodiments described below illustrates a specific example of the present invention. The numerical values, shapes, materials, structural elements, the arrangement and connection of the structural elements, steps, the processing order of the steps etc., shown in the following embodiments are mere examples, and therefore do not limit the present invention. Among the structural elements in the following embodiments, structural elements not recited in any one of the independent claims indicating the most generic concept are described as arbitrary structural elements.

Embodiment 1

FIG. 1 is a block diagram illustrating an example of a functional configuration of a power conversion apparatus and a motor system including the power conversion apparatus according to Embodiment 1.

The basic idea and configuration of the power conversion apparatus and the motor system have been conceived by the inventors of the present invention, and are described in detail in PTL 4: International Publication WO2013/132538. The power conversion apparatus and the motor system have an additional structural element to solve a problem discovered in the invention of this related application. A part of the related application is cited in the following description.

The motor system illustrated in FIG. 1 includes a power conversion apparatus 1, an induction motor 5, and feed lines connecting the power conversion apparatus 1 and the induction motor 5. A single-phase AC power supply 2 supplies a single-phase AC voltage to the motor system. The single-phase AC power supply 2 may be a 100-V or 200-V commercial power supply for households, for example.

The power conversion apparatus 1 converts an input voltage which is a single-phase AC voltage into output voltages forming a two-phase AC voltage. The power conversion apparatus 1 includes: a pair of input terminals 3 and 4 to which the single-phase AC power supply 2 applies the input voltage; a pair of first output terminals 6 and 7 which output one of the output voltages as a first-phase output voltage; a pair of second output terminals 8 and 9 which output the other of the output voltages as a second-phase output voltage; a matrix switch 10; and a switch controller 20.

Figure 2:
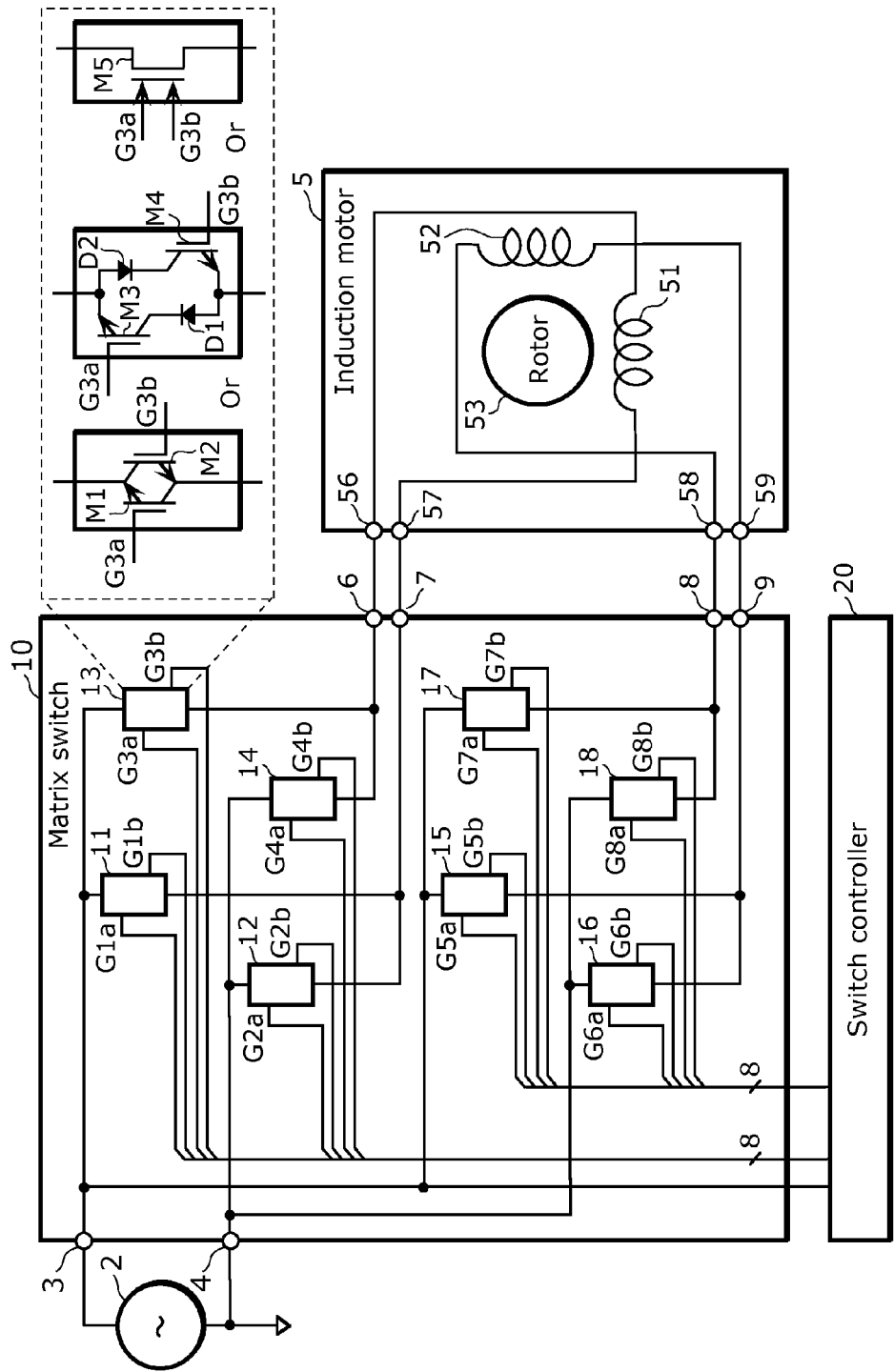
FIG. 2 is a block diagram illustrating an example of a detailed configuration of a matrix switch included in the power conversion apparatus and an induction motor.

FIG. 2 is a block diagram illustrating an example of a detailed configuration of the induction motor 5 and the matrix switch 10. The induction motor 5 is a two-phase induction motor and includes a first axis winding 51, a second axis winding 52, a rotor 53, a pair of first power receiving terminals 56 and 57 connected to the first axis winding 51, and a pair of second power receiving terminals 58 and 59 connected to the second axis winding 52. The first axis winding 51 and the second axis winding 52 are not electrically connected within the induction motor 5. The first axis winding 51 and the second axis winding 52 may have the same electrical characteristics. The first power receiving terminals 56 and 57 are connected to the first output terminals 6 and 7 of the power conversion apparatus 1 via first feed lines, and the second power receiving terminals 58 and 59 are connected to the second output terminals 8 and 9 of the power conversion apparatus 1 via second feed lines. It is to be noted that the number of the first axis winding 51 and the second axis winding 52 need not be one each. It is also possible to form a multipolar motor using two or more first axis windings 51 and second axis windings 52, given that the number is the same for both the first and second axis windings 51 and 52.

The matrix switch 10 includes first bidirectional switches 11 to and second bidirectional switches 15 to 18. The first bidirectional switches 11 to 14 each correspond to a different combination of the input terminal 3 or 4 and the first output terminal 6 or 7, and switch between connection and disconnection between the corresponding one of the input terminals 3 and 4 and the corresponding one of the first output terminals 6 and 7 according to a corresponding one of first control signals G1a to G4b supplied by the switch controller 20.

The second bidirectional switches 15 to 18 each correspond to a different combination of the input terminal 3 or 4 and the second output terminal 8 or 9, and switch between connection and disconnection between the corresponding one of the input terminals 3 and 4 and the corresponding one of the second output terminals 8 and 9 according to a corresponding one of second control signals G5a to G8b supplied by the switch controller 20.

As illustrated with the representative first bidirectional switch 13, each of the first bidirectional switches 11 to 14 and the second bidirectional switches 15 to 18 includes two unidirectional switches connected in inverse parallel, for example. For example, a single unidirectional switch may be a reverse-blocking Isolated Gate Bipolar Transistor (IGBT) M1 or M2, or may be formed as a circuit in which an IGBT M3 and a diode D1 are connected in series or a circuit in which an IGBT M4 and a diode D2 are connected in series. Each unidirectional switch changes its state between a unidirectional conducting state and a non-conducting state according to one of the first control signals G1a to G4b and the second control signals G5a to G8b, and does not conduct in the opposite direction.

Each bidirectional switch may be a single switching element M5. The switching element M5 may be a Hetero Field Effect Transistor (HFET) or Gate Injection Transistor (GIT) comprising a gallium nitride (GaN)-based semiconductor, for example. A bidirectional switch can be formed by providing, between the source and drain of the HFET or GIT, two gates to which independent control signals are applied.

The state of each bidirectional switch having such a configuration can be changed to any of the following: a conducting state in which a current flows bidirectionally; a conducting state in which a current flows only in the upper direction or the lower direction of the drawing; and a non-conducting state. The matrix switch 10 can connect and disconnect the pair of the input terminals 3 and 4 and the pair of the first output terminals 6 and 7 via the first bidirectional switches 11 to 14 according to the first control signals G1a to G4b.

In particular, by forming each bidirectional switch with a single switching element M5, the circuit size can be reduced. Furthermore, since the switching element M5 has two gates adjacent to each other, the two gate signal lines can be formed with substantially the same length, and thus delay between gate signals can be reduced. As a result, the control over the dead time and the commutation circuit increases, and thus misoperation can be prevented.

The switch controller 20 is a controller of the matrix switch 10. The switch controller 20 generates the first control signals G1a to G4b and the second control signals G5a to G8b and supplies them to the matrix switch 10 so that the input voltage that is a single-phase AC voltage is converted into the output voltages forming a two-phase AC voltage via the matrix switch 10. The switch controller 20 may be implemented as an analog circuit including an oscillator, a comparator, a multiplier, and so on. The switch controller 20 may also be implemented by a processor which executes a predetermined program.

Referring to FIG. 1 again, the switch controller 20 includes a target voltage designating unit 23, a control signal generating unit 24, a driver 25, and a target frequency designating unit 26.

The target frequency designating unit 26 designates a target frequency which is the frequency of the output voltages of the power conversion apparatus 1, from among a plurality of predetermined frequencies. The method of setting the target frequency will be described later.

The target voltage designating unit 23 designates a first target voltage representing consecutive target values of the first-phase output voltage and a second target voltage representing consecutive target values of the second-phase output voltage. The first target voltage and the second target voltage form a two-phase AC voltage having the target frequency designated by the target frequency designating unit 26. The target voltage designating unit 23 may generate an analog two-phase AC voltage which designates the first target voltage and the second target voltage, or may generate two numeric sequences indicating the instantaneous values of the first target voltage and the second target voltage at each given time.

The control signal generating unit 24 generates the first control signals G1$a$ to G4$b$ and the second control signals G5$a$ to G8$b$. The first control signals G1$a$ to G4$b$ are control signals for cyclically connecting and disconnecting the pair of the input terminals 3 and 4 and the pair of the first output terminals 6 and 7. The first control signals G1$a$ to G4$b$ are generated based on a comparison between the input voltage and the first target voltage in terms of the polarity and the instantaneous absolute value. The second control signals G5$a$ to G8$b$ are control signals for cyclically connecting and disconnecting the pair of the input terminals 3 and 4 and the pair of the second output terminals 8 and 9. The second control signals G5$a$ to G8$b$ are generated based on a comparison between the input voltage and the second target voltage in terms of the polarity and the instantaneous absolute value.

The control signal generating unit 24 is supplied with the voltage at the input terminal 3 and the voltage at the input terminal 4. The control signal generating unit 24 detects, as the input voltage, a line voltage which is a difference between the voltage at the input terminal 3 and the voltage at the input terminal 4. When the input terminal 4 is grounded with sufficiently low impedance, the control signal generating unit 24 may be supplied only with the voltage at the input terminal 3, and detect, as the input voltage, the voltage at the input terminal 3 relative to the ground voltage.

The driver 25 supplies the generated first control signals G1$a$ to G4$b$ to the first bidirectional switches 11 to 14 and the generated second control signals G5$a$ to G8$b$ to the second bidirectional switches 15 to 18.

The following describes a power conversion method performed by the power conversion apparatus 1 having the above configuration.

Figure 3:
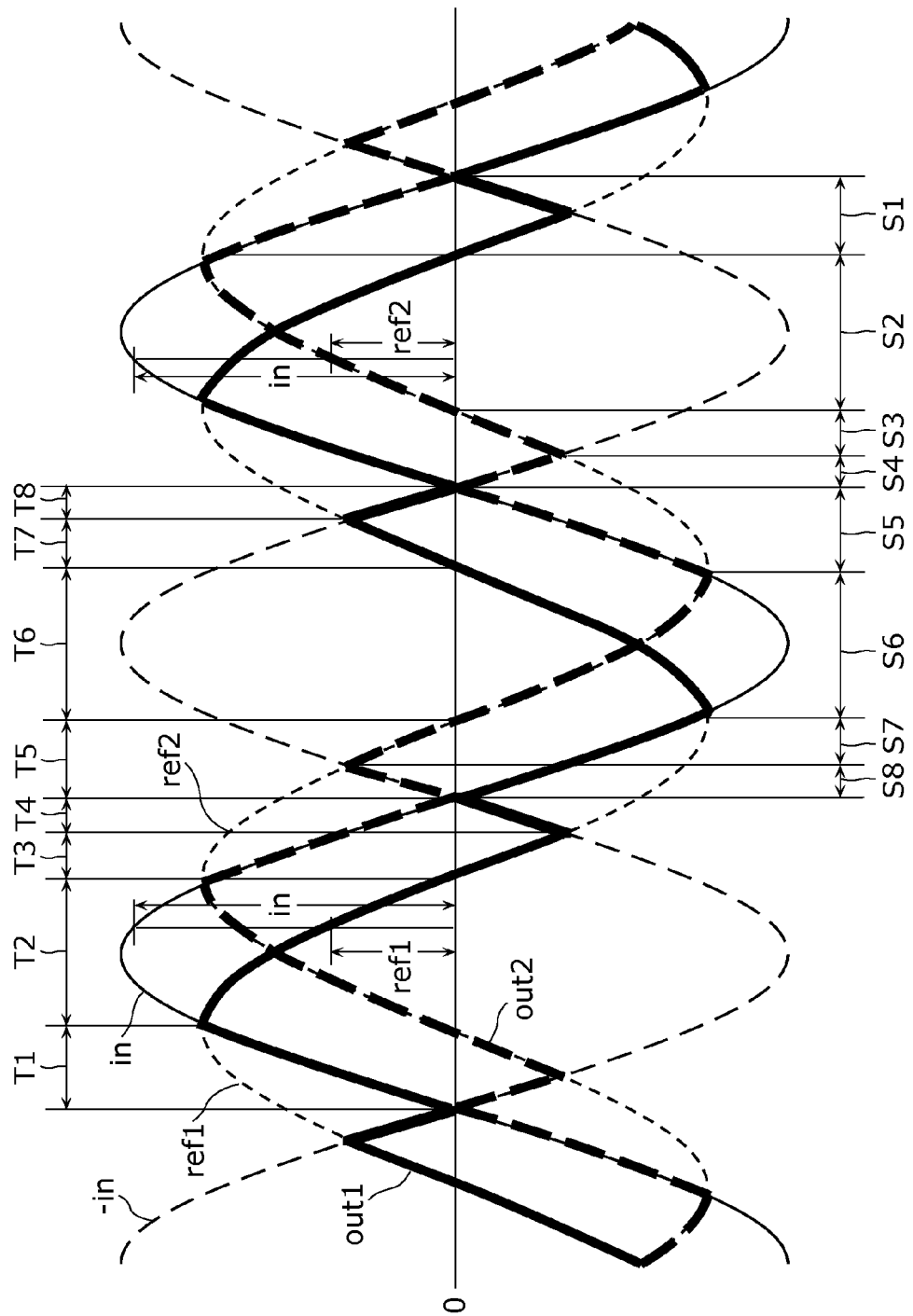
FIG. 3 is a graph illustrating an example of waveforms of main voltages of the power conversion apparatus.

FIG. 3 is a graph illustrating an example of waveforms of main voltages used in the power conversion method. For simplicity, FIG. 3 illustrates an example of the case where the input voltage and the output voltages of the power conversion apparatus 1 have the same frequency.

Referring to FIG. 3, the following first describes the fundamental idea of the power conversion method. FIG. 3 illustrates a typical example of waveforms of input voltages in and −in, a first target voltage ref1, a second target voltage ref2, a first-phase output voltage out1, and a second-phase output voltage out2. Any one of the input voltages in and −in is a single-phase AC voltage applied to the input terminals 3 and 4 from the single-phase AC power supply 2. The input voltage in is a voltage at the input terminal 3 relative to the input terminal 4, and the input voltage −in is a voltage at the input terminal 4 relative to the input terminal 3.

As an example, the input voltage in is expressed as $(\sqrt{2})$ V sin $(\omega t)$ when a sinusoidal AC voltage having V as the effective value of the voltage is applied between the input terminals 3 and 4. Here, w denotes angular frequency, and $\omega=2\pi f$ when the frequency of the sinusoidal AC voltage is f. In addition, t denotes time. As an example, when using the Japanese commercial power supply for households as the input voltage, V is 100 [V] or 200 [V] and f is 50 [Hz] or 60 [Hz].

Each of the first target voltage ref1 and the second target voltage ref2 is one of two AC voltages forming a two-phase AC voltage designated by the target voltage designating unit 23. The first target voltage ref1 and the second target voltage ref2 represent consecutive target values (that is, target values at respective points of time) of the first-phase output voltage out1 and the second-phase output voltage out2, respectively.

In the example illustrated in FIG. 3, when driving the two-phase induction motor using the first-phase output voltage out1 and the second-phase output voltage out2, AC voltages which are the same in frequency and different in phase are used as the first target voltage ref1 and the second target voltage ref2. The amplitude and phase difference of the first target voltage ref1 and the second target voltage ref2 may be appropriately determined for controlling the rotation speed and/or torque and according to the structure of the two-phase induction motor being driven.

For example, the first target voltage ref1 and the second target voltage ref2 may be sinusoidal AC voltages having the same frequency as the frequency of the input voltage in, an amplitude 1/$\sqrt{2}$ times smaller than the amplitude of the input voltage in, and phase differences of +45 degrees and −45 degrees relative to the input voltage in. In this case, the first target voltage ref1 is expressed as V sin $(\omega t+\pi/4)$ and second target voltage ref2 is expressed as V sin $(\omega t-\pi/4)$.

During the time periods T2, T3, T6 and T7 in which the instantaneous absolute value of the input voltage in is greater than the instantaneous absolute value of the first target voltage ref1 (in other words, the absolute value of the input voltage is excessive), the power conversion apparatus 1 cyclically connects and disconnects the pair of the input terminals 3 and 4 and the pair of the first output terminals 6 and 7 via the first bidirectional switches 11 to 14 to regulate the average of the first-phase output voltage out1 in a short period of time (e.g., average for each cycle) to be the instantaneous value represented by the first target voltage ref1. Such control may be performed through Pulse Width Modulation (PWM) control, for example. As the cycles of the PWM control, cycles sufficiently short compared to the cycles of the input voltage in, the first target voltage ref1, and the second target voltage ref2 are used (e.g., cycles of a PWM carrier signal having a frequency of 20 kHz).

The PWM control consecutively changes the connection period per cycle so that the duty cycle, i.e., a ratio of a connection period to the PWM cycle, equals a ratio of a instantaneous value of the first target voltage ref1 to the instantaneous value of the input voltage in. Here, the connection period is a time period for which the pair of the input terminals 3 and 4 and the pair of the first output terminals 6 and 7 are connected. As a result, the average of the first-phase output voltage out1 per cycle is regulated to be the instantaneous value of the first target voltage ref1. The waveform of the first-phase output voltage out1 in FIG. 3 shows the average of the first-phase output voltage out1 per cycle.

It is to be noted that such regulation can be performed not only by the PWM control but also by other known control methods such as Pulse Density Modulation (PDM) control which consecutively changes the length of each cycle with the connection period being constant.

During the time periods T1, T4, T5 and T8 in which the instantaneous absolute value of the input voltage in is less than or equal to the instantaneous absolute value of the first target voltage ref1 (in other words, the absolute value of the input voltage is insufficient), the power conversion apparatus 1 constantly connects the pair of the input terminals 3 and 4 and the pair of the first output terminals 6 and 7 via the first bidirectional switches 11 to 14 to regulate the absolute value of the first-phase output voltage out1 to be the largest generable value. However, during the time periods in which the absolute value of the input voltage is insufficient, the power conversion apparatus 1 may continuously disconnect the pair of the input terminals 3 and 4 and the pair of the first output terminals 6 and 7 to make the first-phase output voltage out1 zero (i.e., the voltage supply may be suspended).

The power conversion apparatus 1 applies the same idea to the input voltage in and the second target voltage ref2 to convert the input voltage in into the second-phase output voltage out2.

In the time periods S1 to S8 illustrated in FIG. 3, there is a relationship between the input voltage in and the second target voltage ref2 in terms of the sign and the instantaneous absolute value. This relationship is the same as that between the input voltage in and the first target voltage ref1 in the time periods T1 to T8 in terms of the sign and the instantaneous absolute value. Thus, in order to convert the input voltage in into the second-phase output voltage out2, the power conversion apparatus 1 performs continuous non-inverting voltage supply during the time periods S1 and S5, performs non-inverting voltage supply through the PWM control during the time periods S2 and S6, performs inverting voltage supply through the PWM control during the time periods S3 and S7, and performs continuous inverting voltage supply during the time periods S4 and S8. As a result, the input voltage in is converted into the second-phase output voltage out2 as illustrated in FIG. 3. As with the waveform of the first-phase output voltage out1, the waveform of the second-phase output voltage out2 in FIG. 3 is represented by the average per cycle.

Next, the following describes the processing performed by the switch controller 20 to execute such a power conversion method.

In FIG. 4 and the following description, the first bidirectional switches 11 to 14 are denoted as SW11 to SW14, respectively, and the first control signals G1a to G4b are denoted as gate signals G1a to G4b of SW11 to SW14, respectively. The ON level of the gate signals G1a to G4b indicates a signal level for placing the unidirectional switches forming the SW11 to SW14 in the conducting state, whereas the OFF level of the gate signals G1a to G4b indicates a signal level for placing the unidirectional switches forming the SW11 to SW14 in the non-conducting state.

FIG. 5A to FIG. 5H are circuit diagrams each illustrating: the conduction states of SW11 to SW14 that are set according to the gate signals G1a to G4b illustrated in FIG. 4 in the time periods T1 to T8; and the current path of the first axis winding 51 determined accordingly. In FIG. 5A to FIG. 5H, the conducting state and the non-conducting state of each of the unidirectional switches forming SW11 to SW14 are denoted by a solid line and a dotted line, respectively, and the current path of the first axis winding 51 is denoted by a thick dashed arrow.

For simplicity, FIG. 4, FIG. 5A to FIG. 5H, and the following description focus on the first target voltage ref1, the gate signals G1a to G4b, and SW11 to SW14 which are for converting the input voltage in into the first-phase output voltage out1. However, the same holds true for the second target voltage ref2, the second control signals G5a to G8b, and the bidirectional switches 15 to 18 which are for converting the input voltage in into the second-phase output voltage out2.

The target voltage designating unit 23 designates the first target voltage ref1 that is a voltage of one of the two phases of the two-phase AC voltage. For example, the target voltage designating unit 23 designates the first target voltage ref1 by actually generating the first target voltage ref1 using an oscillator or by showing the consecutive instantaneous values of the first target voltage ref1 as time-series data.

The control signal generating unit 24 consecutively (e.g., per PWM cycle) determines one of the time periods T1 to T8 as the current period based on a comparison between the instantaneous value of the input voltage in and the instantaneous value of the first target voltage ref1. The control signal generating unit 24 then generates the gate signals G1a to G4b for performing one of the continuous non-inverting voltage supply, the non-inverting voltage supply through the PWM control, the continuous inverting voltage supply, and the inverting voltage supply through the PWM control, according to the determined time period.

Figure 5A:
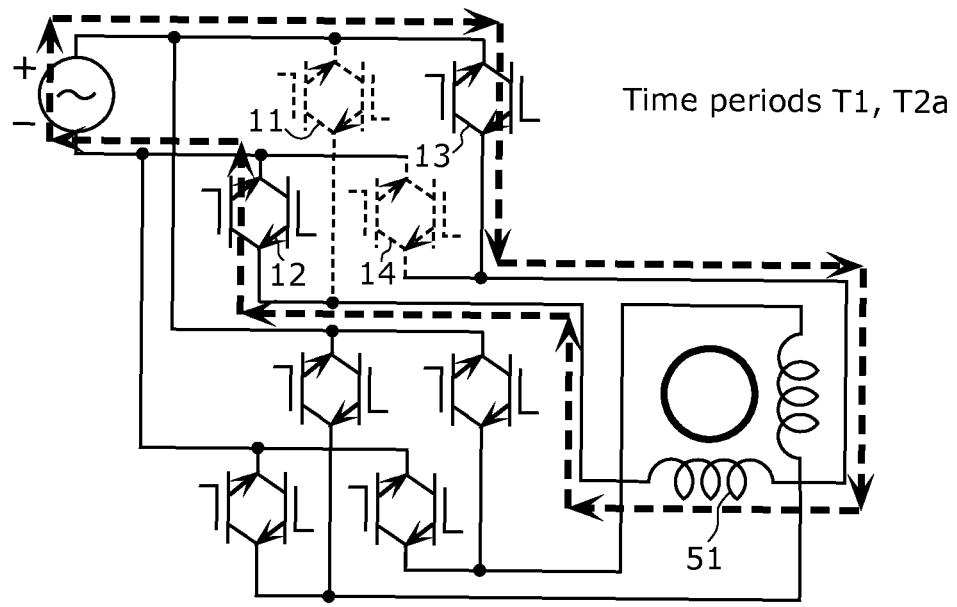
FIG. 5A is a circuit diagram illustrating an example of the states of switches and a current path of the power conversion apparatus.
Figure 5B:
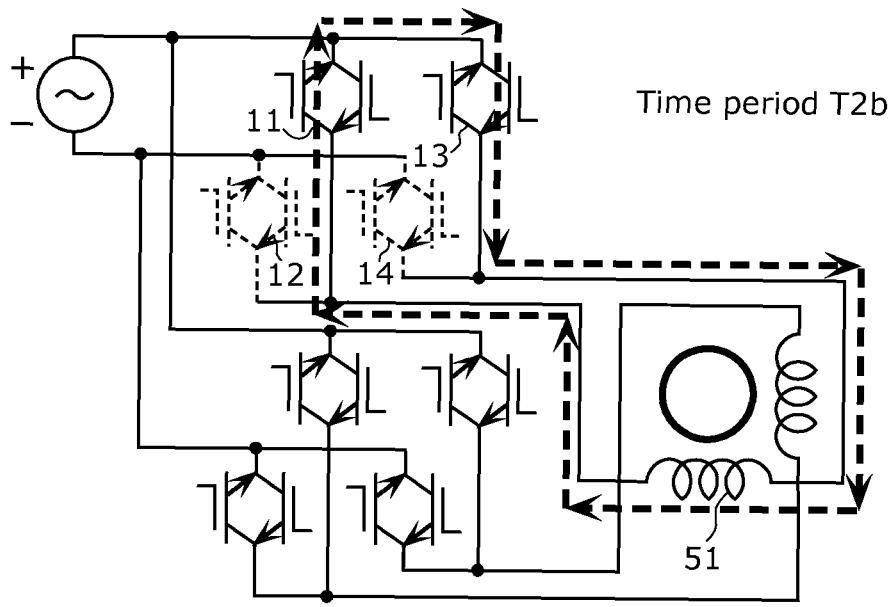
FIG. 5B is a circuit diagram illustrating an example of the states of switches and a current path of the power conversion apparatus.
Figure 5C:
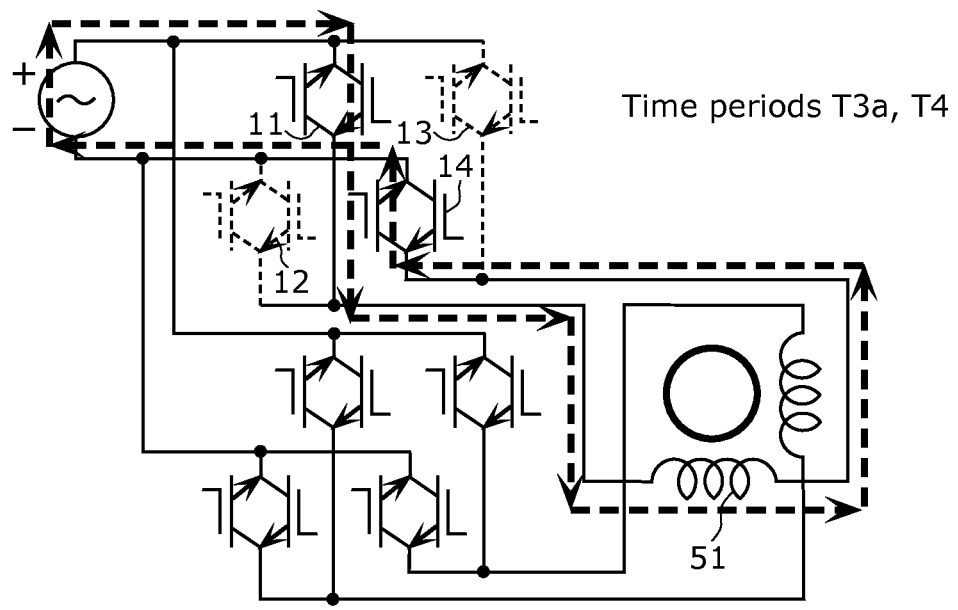
FIG. 5C is a circuit diagram illustrating an example of the states of switches and a current path of the power conversion apparatus.
Figure 5D:
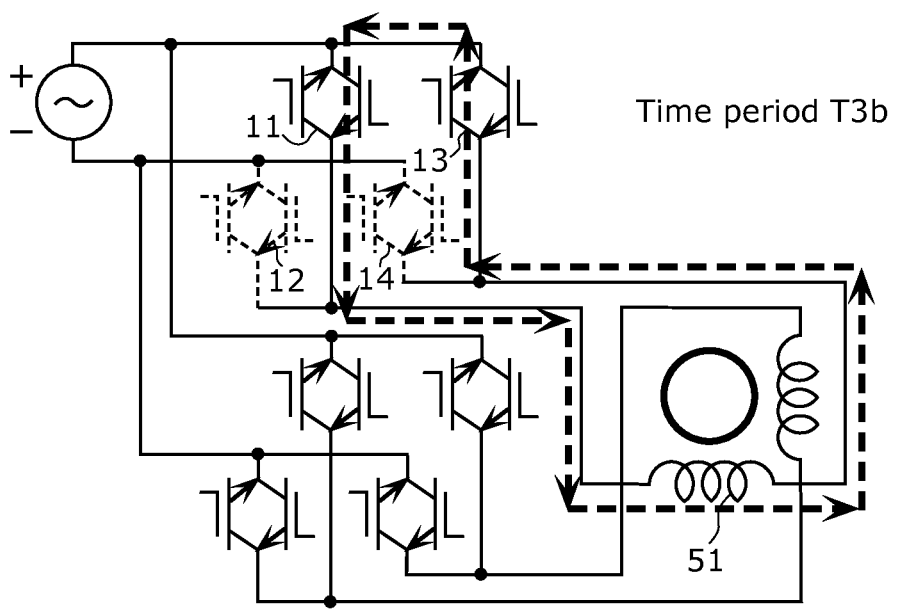
FIG. 5D is a circuit diagram illustrating an example of the states of switches and a current path of the power conversion apparatus.
Figure 5E:
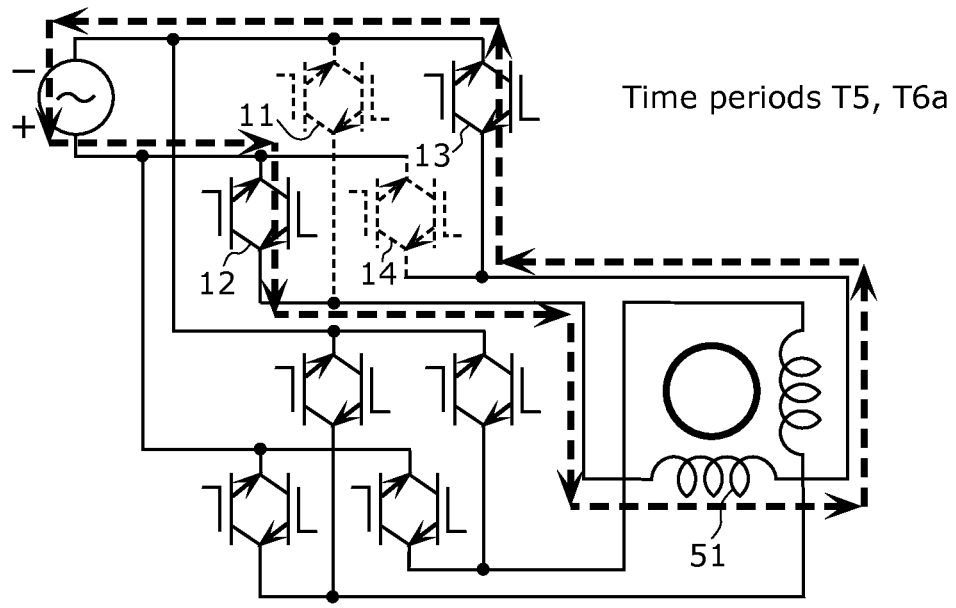
FIG. 5E is a circuit diagram illustrating an example of the states of switches and a current path of the power conversion apparatus.

In the time periods T1 and T5, the gate signals G1a to G4b for the continuous non-inverting voltage supply are generated. The control signal generating unit 24 determines the time period T1 as the current period based on $0 \leq in \leq ref1$ (condition 1), and determines the time period T5 as the current period based on $0 > in \geq ref1$ (condition 5). Upon determination of the time period T1 or T5, the control signal generating unit 24 sets the gate signals G1a and G2b of SW12 and the gate signals G3a and G3b of SW13 to the ON level, and sets the gate signals G1a and G1b of SW11 and the gate signals G4a and G4b of SW14 to the OFF level. According to such gate signals G1a to G4b, in the time periods T1 and T5, the conduction states of SW11 to SW14 and the current path of the first axis winding 51 are set as illustrated in FIG. 5A and FIG. 5E for making a straight connection between the pair of the input terminals 3 and 4 and the pair of the first output terminals 6 and 7, to perform the continuous non-inverting voltage supply.

In the case of the condition 1 and condition 5, the switching is not performed, and thus switching loss is reduced.

In the time periods T2 and T6, the first control signals G1a to G4b for the non-inverting voltage supply through the PWM control are generated. The control signal generating unit 24 determines the time period T2 as the current period based on $0 \leq ref1 < in$ (condition 2), and determines the time period T6 as the current period based on $0 > ref1 > in$ (condition 6). Upon determination of the time period T2 or T6, the control signal generating unit 24 sets the levels of the gate signals G1a to G4b in power feeding period T2a, T6a in the same manner as in the time period T1, T5. Each of the power feeding periods T2a and T6a mentioned here is a part of the PWM cycle.

Figure 5F:
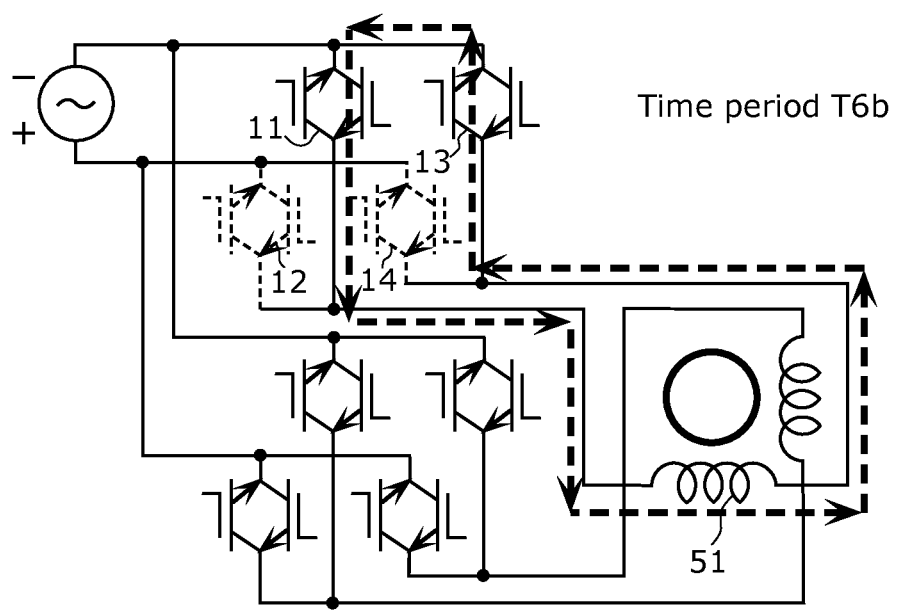
FIG. 5F is a circuit diagram illustrating an example of the states of switches and a current path of the power conversion apparatus.

The control signal generating unit 24 consecutively changes the lengths of the power feeding periods T2a and T6a so that the ratio of the power feeding period T2a, T6a to the PWM cycle equals the ratio of the instantaneous value of the first target voltage ref1 to the instantaneous value of the input voltage in. In the example illustrated in FIG. 4, the lengths of the power feeding periods T2a and T6a are gradually reduced, and become zero at the end of the time periods T2 and T6. Furthermore, the control signal generating unit 24 sets the gate signals G1a and G1b of SW11 and the gate signals G3a and G3b of SW13 to the ON level, and sets the gate signals G2a and G2b of SW12 and the gate signals G4a and G4b of SW14 to the OFF level in regeneration periods T2b and T6b, each of which is the remaining part of the PWM cycle. According to such gate signals G1a to G4b, in the time periods T2a and T6a, the conduction states of SW11 to SW14 and the current path of the first axis winding 51 are set as illustrated in FIG. 5A and FIG. 5E for making a straight connection between the pair of the input terminals 3 and 4 and the pair of the first output terminals 6 and 7, to perform the non-inverting voltage supply. Furthermore, in the time periods T2a and T6a, the conduction states of SW11 to SW14 and the current path of the first axis winding 51 are set as illustrated in FIG. 5B and FIG. 5F for short-circuiting the pair of the first output terminals 6 and 7, to perform power regeneration which allows circulation, within the matrix switch 10, of a regenerative current from the first axis winding 51. As a result, the non-inverting voltage supply through the PWM control (cyclical power feeding and regeneration) is performed in the time periods T2 and T6.

In the time periods T3 and T7, the gate signals G1a to G4b for the inverting voltage supply through the PWM control are generated. The control signal generating unit 24 determines the time period T3 as the current period based on 0>ref1>−in (condition 3), and determines the time period T7 as the current period based on 0<ref1<−in (condition 7). Upon determination of the time period T3 or T7, the control signal generating unit 24 sets the gate signals G1a and G1b of SW11 and the gate signals G4a and G4b of SW14 to the ON level and sets the gate signals G2a and G2b of SW12 and the gate signals G3a and G3b of SW13 to the OFF level in power feeding period T3a, T7a each of which is a part of the PWM cycle.

Figure 5G:
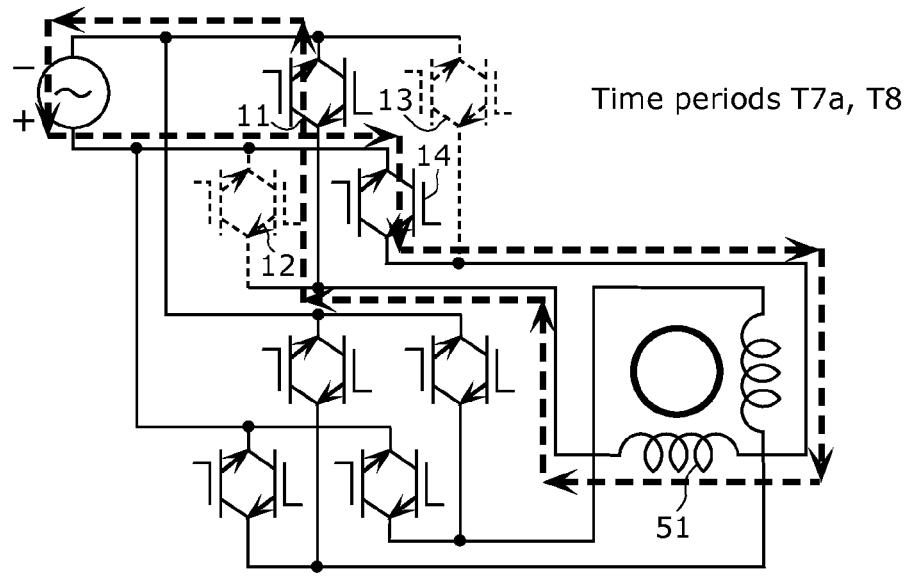
FIG. 5G is a circuit diagram illustrating an example of the states of switches and a current path of the power conversion apparatus.
Figure 5H:
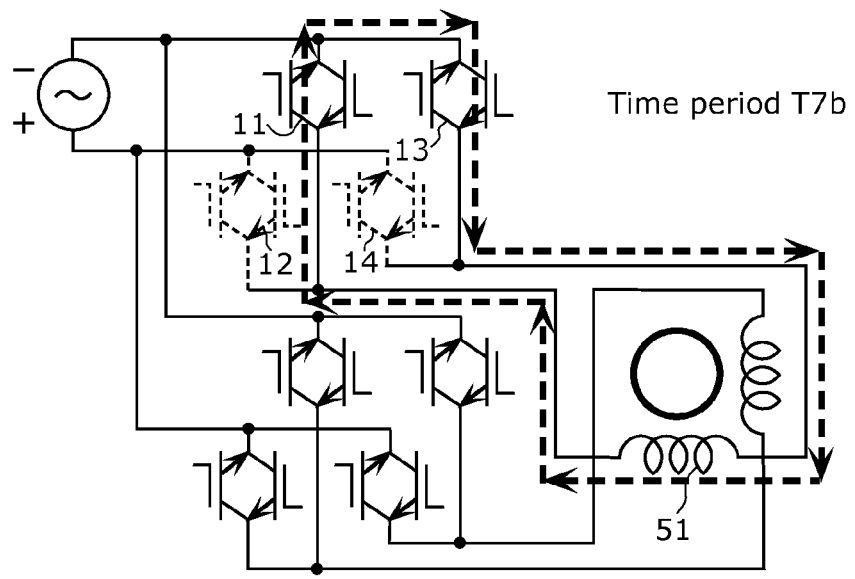
FIG. 5H is a circuit diagram illustrating an example of the states of switches and a current path of the power conversion apparatus.

The control signal generating unit 24 consecutively changes the lengths of the power feeding periods T3a and T7a so that the ratio of the power feeding period T3a, T7a to the PWM cycle equals the ratio of the instantaneous value of the first target voltage ref1 to the instantaneous value of the input voltage in. In the example illustrated in FIG. 4, the lengths of the power feeding periods T3a and T7a are zero at the beginning of the time periods T3 and T7, and are gradually increased afterward. Furthermore, in regeneration periods T3b and T7b, each of which is the remaining part of the PWM cycle, the control signal generating unit 24 sets the levels of the gate signals G1a to G4b in the same manner as in the time periods T2b and T6b, respectively. According to such gate signals G1a to G4b, in the time periods T3a and T7a, the conduction states of SW11 to SW14 and the current path of the first axis winding 51 are set as illustrated in FIG. 5C and FIG. 5G for making a cross connection between the pair of the input terminals 3 and 4 and the pair of the first output terminals 6 and 7, to perform the inverting voltage supply. Furthermore, in the time periods T3b and T7b, the conduction states of SW11 to SW14 and the current path of the first axis winding 51 are set as illustrated in FIG. 5D and FIG. 5H for short-circuiting the pair of the first output terminals 6 and 7, to perform power regeneration which allows circulation, within the matrix switch 10, of a regenerative current from the first axis winding 51. As a result, the inverting voltage supply through the PWM control (cyclical power feeding and regeneration) is performed in the time periods T3 and T7.

In the time periods T4 and T8, the gate signals G1a to G4b for the continuous inverting voltage supply are generated. The control signal generating unit 24 determines the time period T4 as the current period based on 0>=in≥ref1 (condition 4), and determines the time period T8 as the current period based on 0<−in≤ref1 (condition 8). Upon determination of the time period T4 or T8, the control signal generating unit 24 sets the levels of the gate signals G1a to G4b in the same manner as in the time period T3a, T7a. According to such gate signals G1a to G4b, in the time periods T4 and T8, the conduction states of SW11 to SW14 and the current path of the first axis winding 51 are set as illustrated in FIG. 5C and FIG. 5G for making a cross connection between the pair of the input terminals 3 and 4 and the pair of the first output terminals 6 and 7, to perform the continuous inverting voltage supply.

In the case of the condition 4 and condition 8, the switching is not performed and thus switching loss is reduced, as in the case of the condition 1 and condition 5.

The inventors of the present invention conducted an experiment of rotating a two-phase motor at variable rpm using the power conversion apparatus 1 having the above configuration.

In more detail, an input voltage having a frequency of 60 Hz was supplied to the power conversion apparatus 1, and frequencies of 30 Hz, 60 Hz, and 120 Hz were designated as the target frequency. With this, the power conversion apparatus 1 generated two-phase output voltages having frequencies of 30 Hz, 60 Hz, and 120 Hz and phase differences of +45 degrees and −45 degrees relative to the input voltage, and applied the two-phase output voltages to the two-phase motor. The two-phase motor rotated with the output voltages having frequencies of 60 Hz and 30 Hz, but did not rotate with the output voltages having a frequency of 120 Hz.

To consider such behaviors of the two-phase motor, the inventors performed a simulation to compute the winding currents, rpm, and torque of the two-phase motor.

FIG. 6A to FIG. 6C are graphs illustrating variations, with time, of a current iload1 of the first axis winding of the two-phase motor and a current iload2 of the second axis winding of the two-phase motor. The graphs illustrate values calculated by simulation. FIG. 6A to FIG. 6C illustrate the current iload1 of the first axis winding and the current iload2 of the second axis winding when the frequency of the input voltage (hereinafter referred to as "input frequency") is 60 Hz and the frequency of the output voltages (hereinafter referred to as "output frequency") is 60 Hz, 120 Hz, and 30 Hz.

When the output frequency was the same as the input frequency, i.e., when the output frequency was 60 Hz (FIG. 6A) and when the output frequency was half the input frequency, i.e., when the output frequency was 30 Hz (FIG. 6C), the peak value of iload1 and the peak value of iload2 were substantially the same, and the simple arithmetic average in one cycle of iload1 and the simple arithmetic average in one cycle of iload2 were both substantially zero.

In contrast, when the output frequency was a frequency twice the input frequency, i.e., when the output frequency was 120 Hz (FIG. 6B), the peak value of iload1 and the peak value of iload2 were different from each other, and the simple arithmetic average in one cycle of iload1 was a positive value whereas the simple arithmetic average in one cycle of iload2 was a negative value.

In FIG. 6A to FIG. 6C and the following description, the simple arithmetic average in one cycle of a winding current is referred to as "offset current".

FIG. 7 is a graph illustrating the input voltage, target voltage, and output voltage when a ratio of the output frequency to the input frequency (hereinafter referred to as "output frequency ratio") is 2 as an example. The target voltage and the output voltage illustrated here are the target voltage and the output voltage of one of the first phase and the second phase.

During the time periods in which the target voltage is negative, a voltage equal to the target voltage is supplied as the output voltage in order to prevent the absolute value of the input voltage from being insufficient relative to the target voltage. On the other hand, as illustrated in FIG. 7, in the diagonally shaded parts of the time periods in which the target voltage is positive, the output voltage is lower than the target voltage because the absolute value of the input voltage is insufficient relative to the target voltage.

As a result, the simple arithmetic average in one cycle of the output voltage is −0.15 in a ratio of the peak value (absolute value) of the output voltage to the peak value (absolute value) of the input voltage.

The simple arithmetic average in one cycle of the output voltage is referred to as "offset voltage", and the ratio of the value of the offset voltage to the peak value (absolute value) of the input voltage is referred to as "offset voltage ratio". The offset voltage ratio can take both a positive value and a negative value. Such an offset voltage included in the output voltage is considered to be the cause of the above-described offset current generated in the winding current.

The following is the inventors' consideration of the reason why the motor does not rotate. The rotation of the motor is inhibited because when the output voltages include the offset voltage, the offset current generated in the winding current forms a constantly-unidirectional magnetic field (i.e., irrotational magnetic field) around a stator coil to which the offset voltage is applied.

To verify this, the inventors simulated the motor rotation in the case of intentionally adding the offset voltage to a sinusoidal voltage in imitation of the output voltages including the offset voltage and applying the resulting sinusoidal voltage to the motor. The frequency of the output voltages is set to a frequency corresponding to 1000 rpm of the motor, and the offset voltage ratio of the intentionally-added offset voltage is set to 0 (no offset voltage is added) or 0.14.

FIG. 8A and FIG. 8B are graphs illustrating results of the simulation.

As illustrated in FIG. 8A, the motor started to rotate when the offset voltage ratio was 0, and the motor rotated at the target rpm of 1000 rpm after a lapse of a stable rotation period. The torque was small and stable at the start.

On the other hand, the rpm of the motor did not reach the target rpm when the offset voltage ratio was 0.14, as illustrated in FIG. 8B. The torque was large from the beginning of the rotation, and fluctuated between positive and negative values. FIG. 8B illustrates that the rpm cyclically took positive and negative values and the motor vibrated in the positive rotation direction and the negative rotation direction without rotating.

This simulation identified that the reason why the motor does not rotate lies in the offset voltage rather than in a specific combination of the input frequency and the output frequency.

In view of this, a stable rotation period was computed for some offset voltage ratios included in a range from 0 to 0.14.

FIG. 9 is a graph illustrating a relationship between the stable rotation period and the offset voltage ratio. The stable rotation period is constant when the offset voltage ratio is smaller than or equal to 0.02, and thus it is considered that the motor stably rotates as in the case of the offset voltage ratio being 0. On the other hand, the stable rotation period starts to increase when the absolute value of the offset voltage ratio is larger than 0.02, and thus it is considered that the motor possibly rotates unstably.

When the offset voltage ratio is negative, a magnetic field is constantly generated around the stator coil, to which the offset voltage is applied, in a direction opposite the direction of a magnetic field generated when the offset voltage ratio is positive. Thus, the above statement regarding the stability of the motor rotation when the offset voltage ratio is positive also applies to the case where the offset voltage ratio is negative, according to the absolute value of the offset voltage ratio.

As a result of the above consideration, the inventors found out that the condition for the motor to stably rotate is an offset voltage ratio greater than or equal to −0.02 and smaller than or equal to 0.02 (i.e., in a range of ±2%).

Next, assuming the case of rotating the motor at variable rpm using an input voltage having a constant frequency, the inventors computed the offset voltage ratio for each of a plurality of output frequency ratios (ratios of the output frequency to the input frequency).

Figure 10:
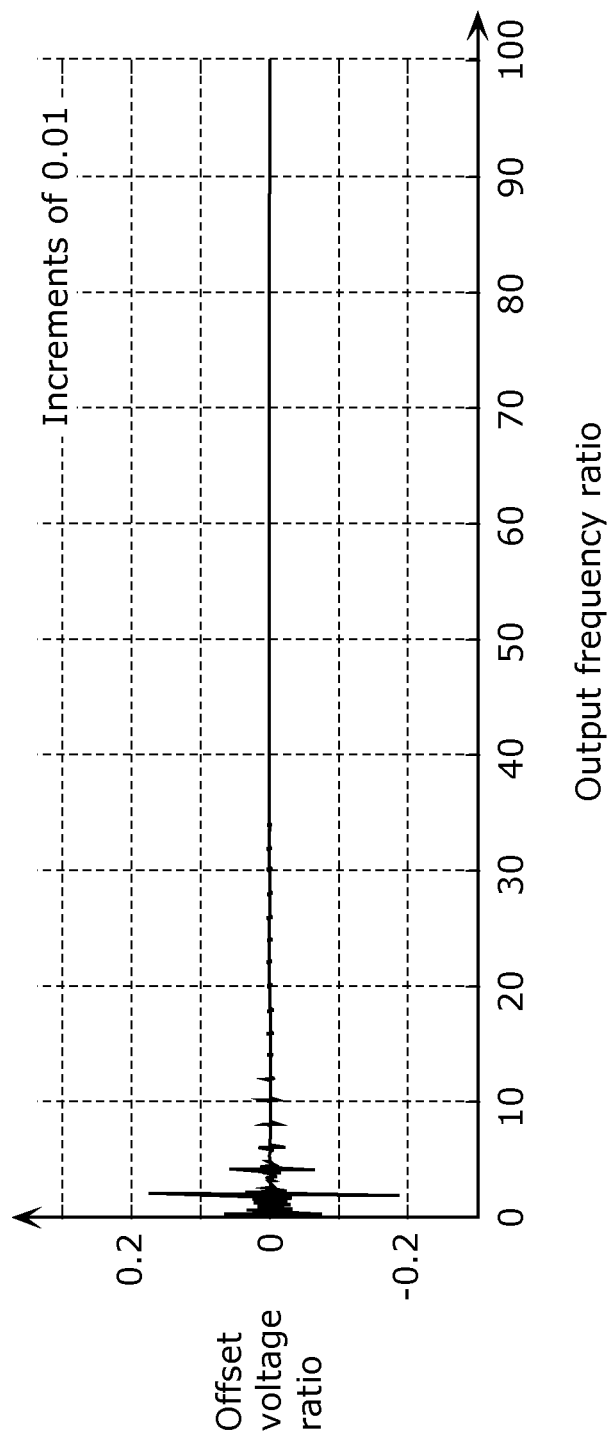
FIG. 10 is a graph illustrating an example of a relationship between an offset voltage ratio and an output frequency ratio of the power conversion apparatus.

FIG. 10 is a graph illustrating a relationship between the offset voltage ratio and the output frequency ratio. FIG. 10 illustrates offset voltage ratios corresponding to output frequency ratios ranging from 1 to 100 in increments of 0.01. As can be seen from FIG. 10, the offset voltage ratio takes a local maximal value when the output frequency ratio is a multiple of 2.

Figure 11:
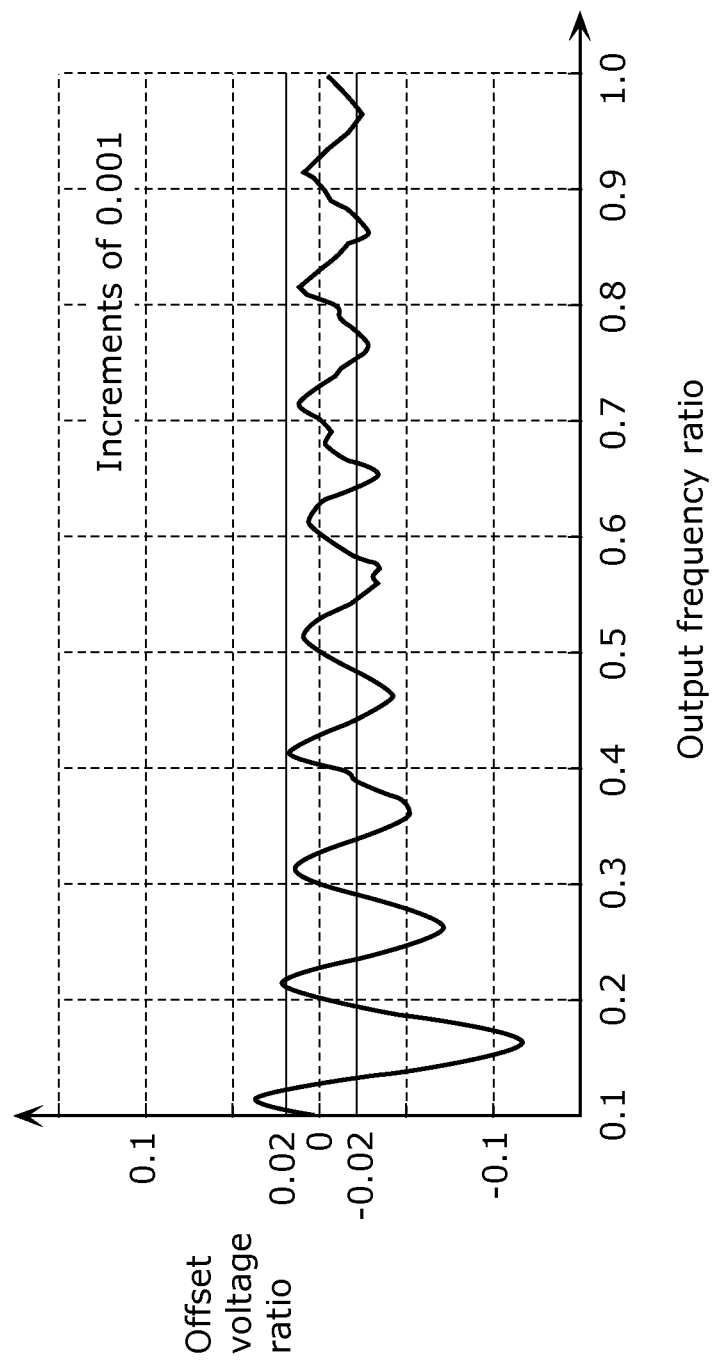
FIG. 11 is a graph illustrating an example of a relationship between an offset voltage ratio and an output frequency ratio of the power conversion apparatus.

FIG. 11 is a graph illustrating a relationship between the offset voltage ratio and the output frequency ratio. FIG. 11 illustrates offset voltage ratios corresponding to output frequency ratios ranging from 0.1 to 1 in increments of 0.001. As can be seen from FIG. 11, the offset voltage ratio is 0 when the output frequency ratio is an integral multiple of 0.1. When the output frequency ratio is 0.16, the offset voltage ratio is −0.12, which is the worst value in the range shown in the graph.

Figure 12:
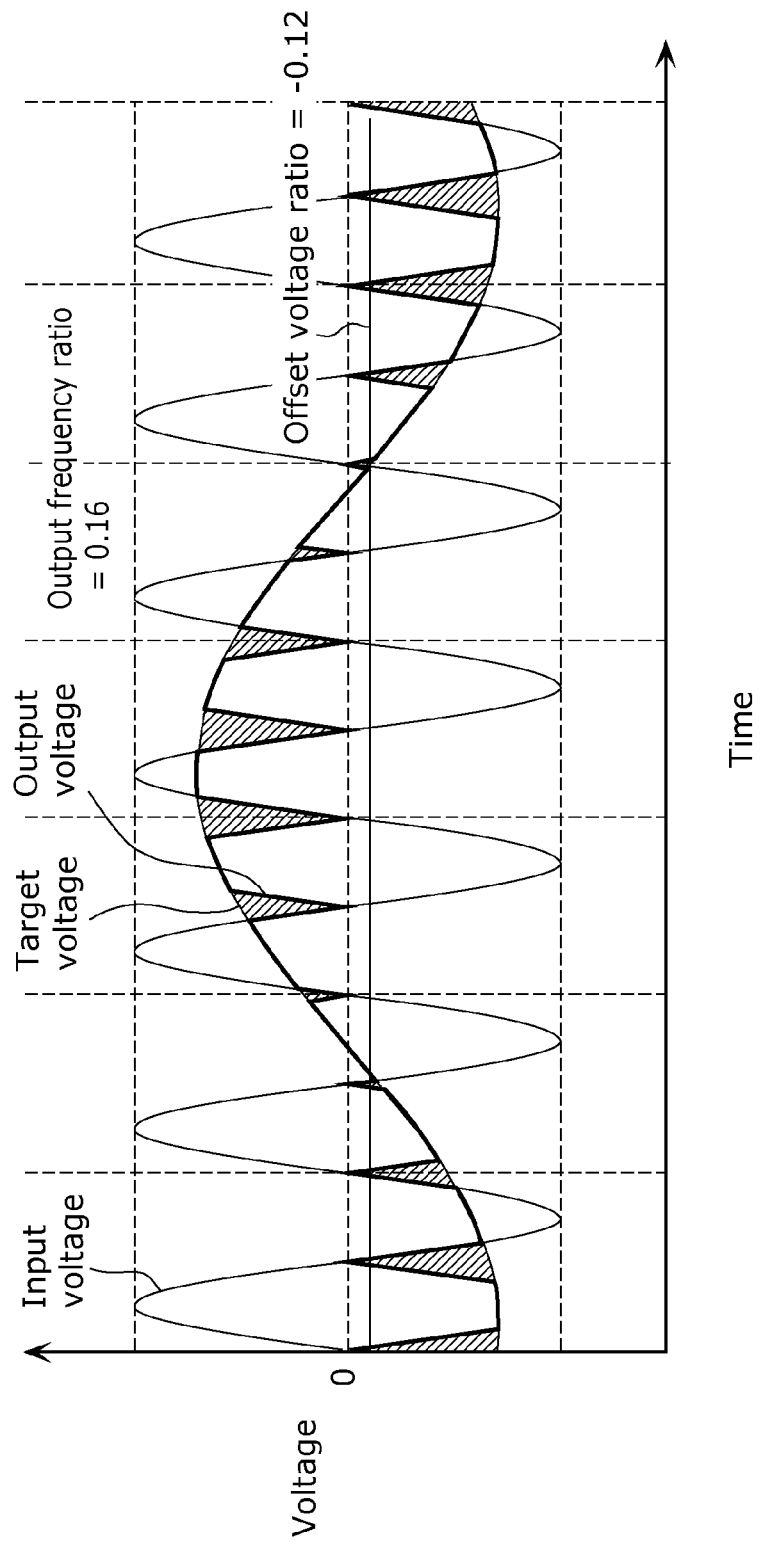
FIG. 12 is a graph illustrating an example of waveforms of an input voltage, a target voltage, and an output voltage of the power conversion apparatus.

FIG. 12 is a graph illustrating the input voltage, target voltage, and output voltage when the output frequency ratio is 0.16. The graph in FIG. 12 is drawn according to the same notational system as FIG. 7. As illustrated in FIG. 12, the diagonally shaded parts when the target voltage is positive appear to have the same area as the diagonally shaded parts when the target voltage is negative. However, by accurately calculating the waveform of the output voltage and integrating the output voltages in a long cycle, it was found out for the first time that there is a large offset voltage.

Figure 13:
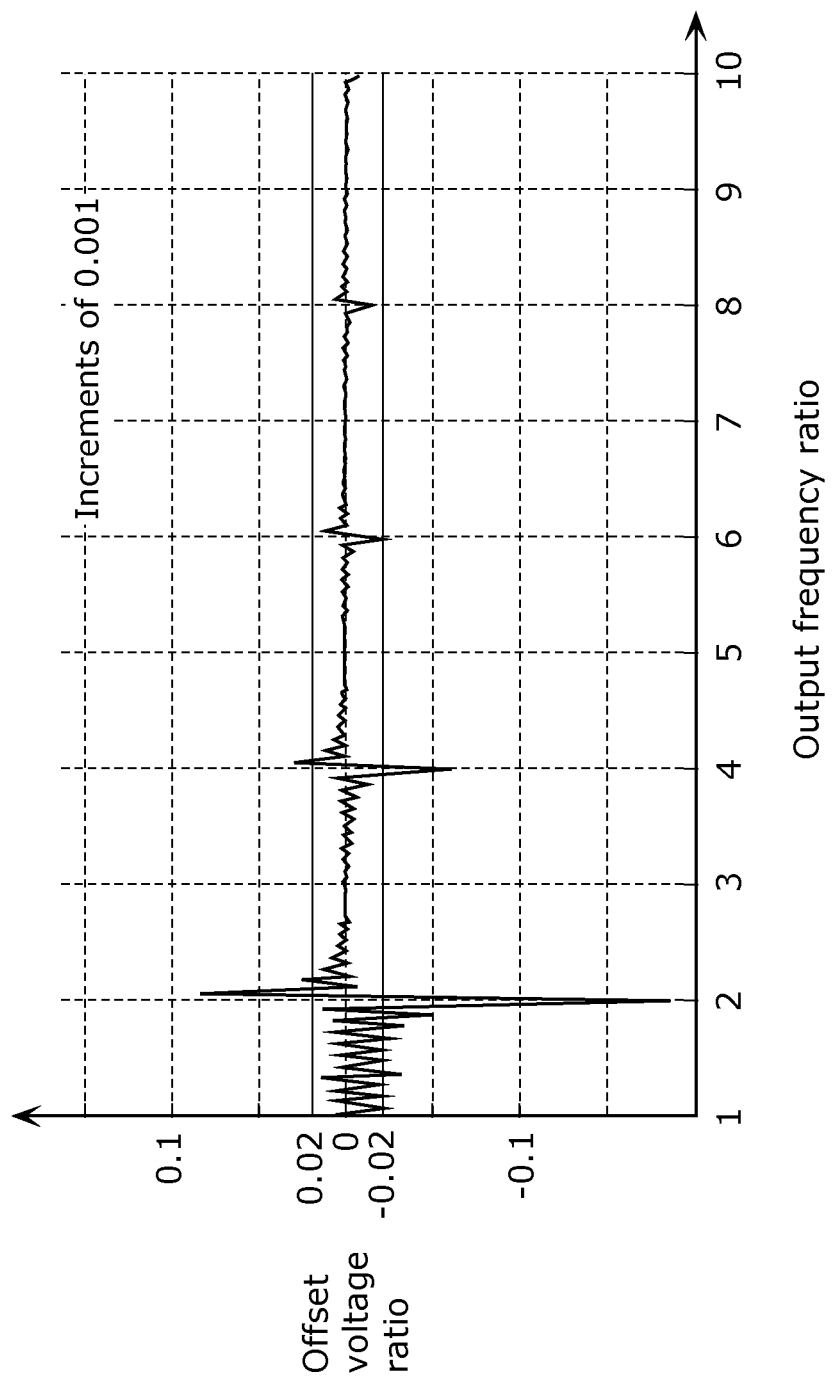
FIG. 13 is a graph illustrating an example of a relationship between an offset voltage ratio and an output frequency ratio of the power conversion apparatus.

FIG. 13 is a graph illustrating a relationship between the offset voltage ratio and the output frequency ratio. FIG. 13 illustrates offset voltage ratios corresponding to output frequency ratios ranging from 1 to 10 in increments of 0.001. FIG. 13 illustrates FIG. 10 in detail, i.e., FIG. 13 illustrates the offset voltage ratio taking a local maximal value when the output frequency ratio is 2, 4, 6, 8, and 10. Especially when the output frequency ratio is 2, 4, and 6, the absolute value of the offset voltage ratio becomes larger than 0.02. Thus, an output frequency ratio other than 2, 4, and 6 may be used when rotating the motor with the output voltages. In particular, an output frequency ratio other than 2, which makes the offset voltage ratio the worst value in the range shown in the graph, may be used.

Figure 14:
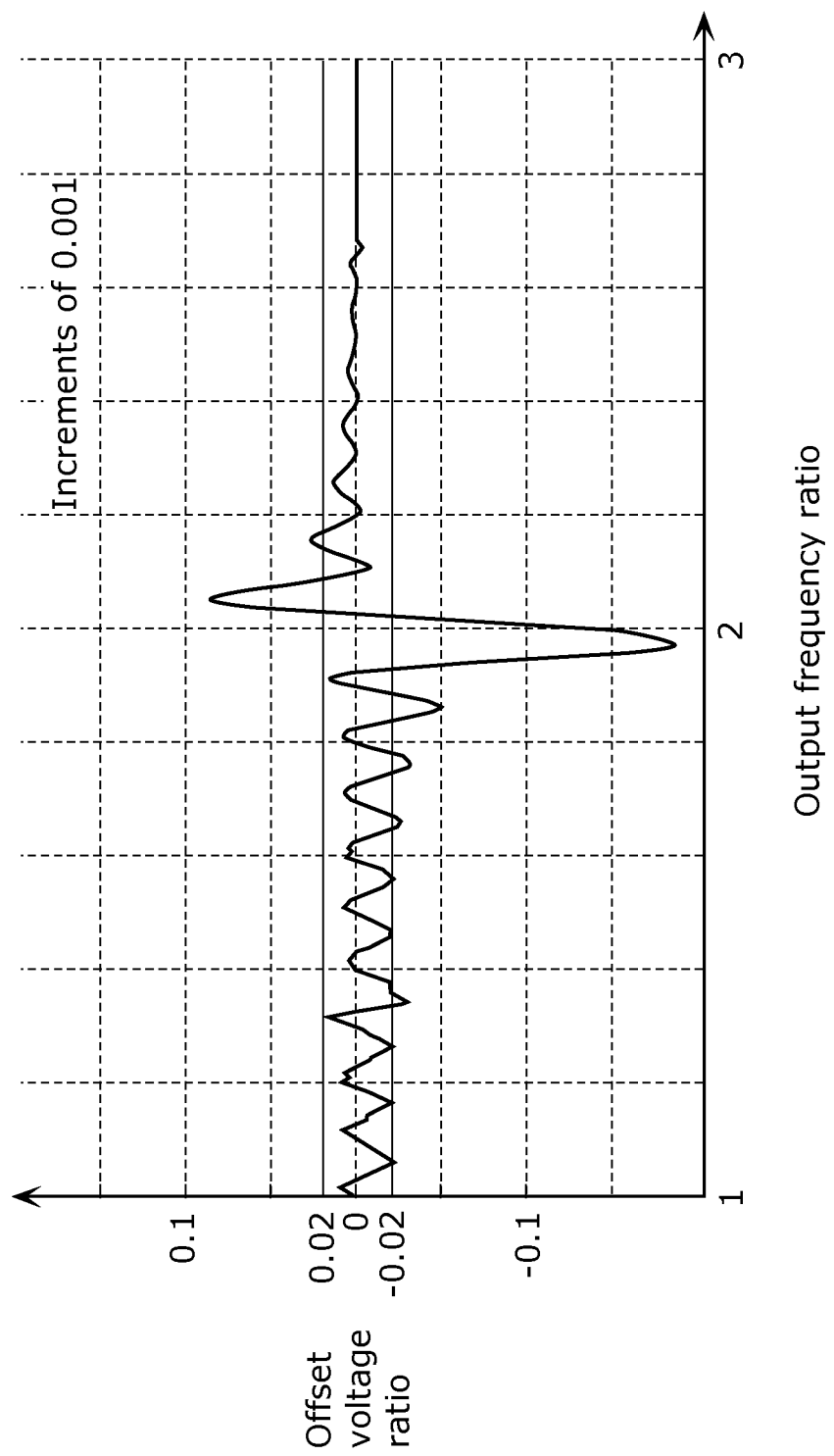
FIG. 14 is a graph illustrating an example of a relationship between an offset voltage ratio and an output frequency ratio of the power conversion apparatus.

FIG. 14 is an enlarged graph illustrating the output frequency ratios 1 through 3 illustrated in FIG. 13. As can be seen from FIG. 14, the offset voltage ratio is 0 when the output frequency ratio is 1.0, 1.1, 1.2, 1.3, 1.4, 1.5, 1.6, 1.7, 1.8, 1.9, 2.1, 2.2, 2.3, 2.4, and between 2.5 to 3.0 inclusive. Thus, an output frequency ratio selected from among these output frequency ratios may be used when rotating the motor with the output voltages.

From the above consideration, when rotating the motor with the output voltage, the target frequency designating unit 26 may designate a frequency other than a frequency twice the frequency fin of the input voltage, as the frequency fout1 of the first target voltage and the frequency fout2 of the second target voltage. The target frequency designating unit 26 may also designate a frequency other than a frequency four times the frequency fin of the input voltage or a frequency other than a frequency six times the frequency fin of the input voltage.

Furthermore, the target frequency designating unit 26 may designate a frequency expressed as n×fin/10, where n is an integer other than 20, 40, and 60, as the frequency fout1 of the first target voltage and the frequency fout2 of the second target voltage. Here, 80 and 100 may also be excluded from n.

It is to be noted that the frequency fout1 of the first target voltage is equivalent to the frequency of the first-phase output voltage, and the frequency fout2 of the second target voltage is equivalent to the frequency of the second-phase output voltage. Furthermore, fout1 and fout2 are equal. Hereinafter, these frequencies fout1 and fout2 are not distinguished from each other and are referred to as the output frequency fout.

Next, the following describes motor rotation control which is performed by designating the output frequency fout in the above-described manner.

To control the activation and suspension of the motor, it is a common practice to change the output frequency fout with time. Taking the activation of the motor as a representative example, the following describes motor acceleration control.

First, the following describes the acceleration control performed when the ultimate target value of the output frequency fout is smaller than or equal to the input frequency fin. As an example, it is assumed that the ultimate target value of the output frequency fout is equal to the input frequency fin, that is, the ultimate target value of the output frequency ratio is 1.

Figure 15A:
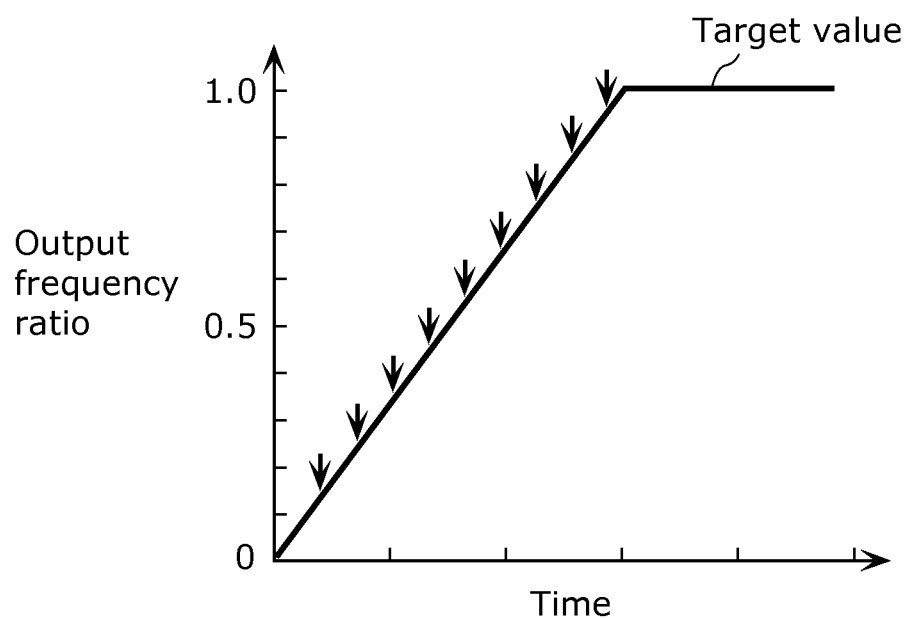
FIG. 15A is a graph illustrating an example of variations of an output frequency ratio with time according to conventional acceleration control.

FIG. 15A is a graph illustrating an example of variations of the output frequency ratio with time according to conventional acceleration control. According to this example of the conventional acceleration control, the output frequency fout is consecutively increased from 0 to the ultimate target value (i.e., the output frequency ratio is consecutively increased from 0 to 1). In this case, at the output frequency ratios indicated by arrows, the output voltages include the offset voltage larger than 0.02 in absolute value of the offset voltage ratio (cf. FIG. 11). Thus, there is apprehension that stable acceleration of the motor is inhibited.

Figure 15B:
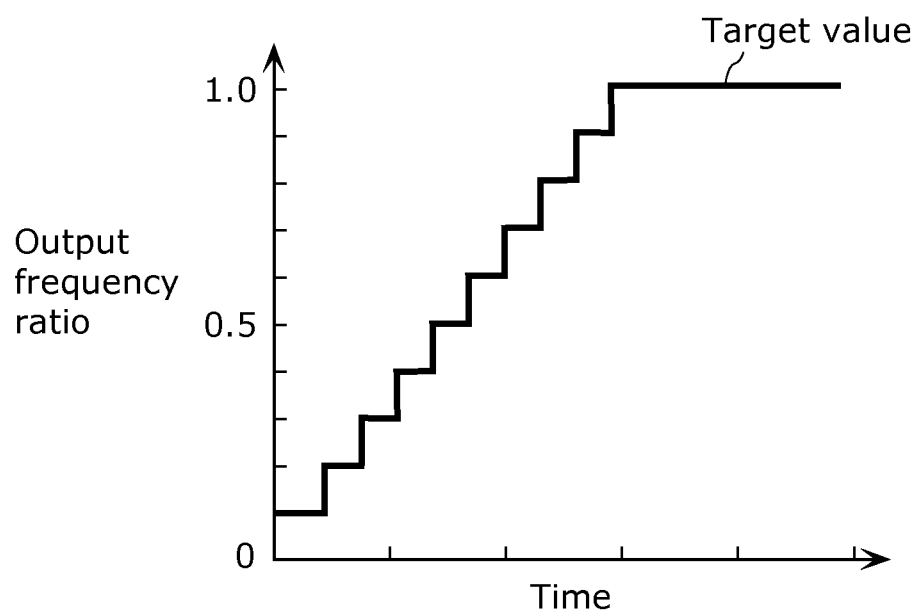
FIG. 15B is a graph illustrating an example of variations of an output frequency ratio with time according to acceleration control of a power conversion method according to Embodiment 1.

FIG. 15B is a graph illustrating an example of variations of the output frequency ratio with time according to the acceleration control of the present embodiment. According to the acceleration control of the present embodiment, the output frequency fout is discretely increased to allow the output frequency fout to be n×fin/10, where n is an integer from 1 to 10 inclusive (i.e., the output frequency ratio is discretely increased from 0.1 to 1 inclusive in increments of 0.1). In this case, the offset voltage ratio of the output voltages is substantially 0 at any frequency (cf. FIG. 11). Thus, there is no apprehension that stable acceleration of the motor is inhibited.

Deceleration control of the motor can be performed based on the same idea. More specifically, the output frequency fout is discretely decreased to allow the output frequency fout to be n×fin/10, where n is an integer from 10 to 1 inclusive (i.e., the output frequency ratio is discretely decreased from 1 to 0.1 inclusive in increments of −0.1).

With such control, the motor can be accelerated and decelerated using output voltages at a plurality of frequencies that do not include the offset voltage.

Next, the following describes the acceleration control performed when the ultimate target value of the output frequency fout is larger than the input frequency fin. As an example, it is assumed that the ultimate target value of the output frequency fout is 10 times larger than the input frequency fin, that is, the ultimate target value of the output frequency ratio is 10.

Figure 16A:
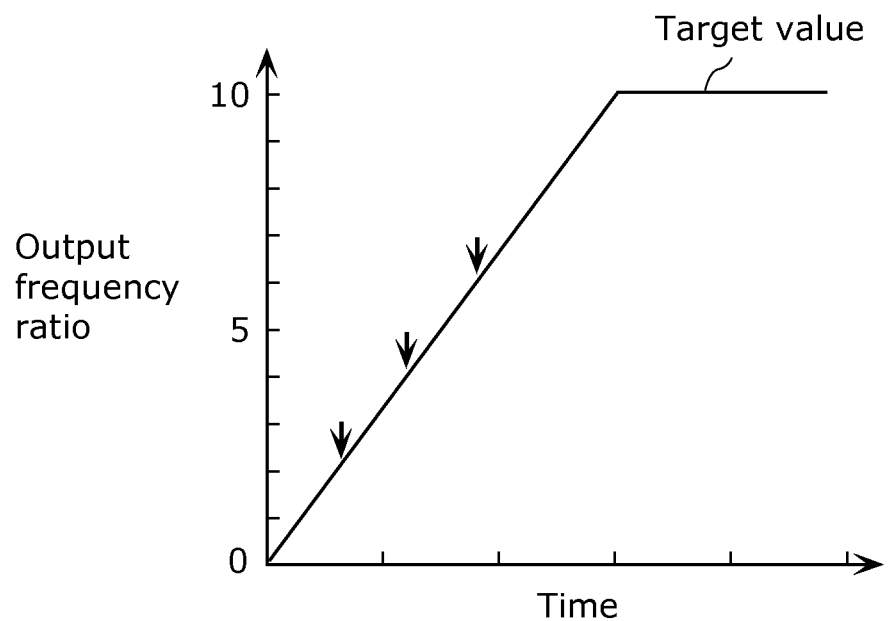
FIG. 16A is a graph illustrating an example of variations of an output frequency ratio with time according to conventional acceleration control.

FIG. 16A is a graph illustrating an example of variations of the output frequency ratio with time according to the conventional acceleration control. According to this example of the conventional acceleration control, the output frequency fout is consecutively increased from 0 to the ultimate target value. More specifically, the output frequency ratio is consecutively increased from 0 to 10 inclusive.

In this case, at the output frequency ratios indicated by arrows, the output voltages include the offset voltage larger than 0.02 in absolute value of the offset voltage ratio (cf. FIG. 13). Thus, there is apprehension that stable acceleration of the motor is inhibited.

Figure 16B:
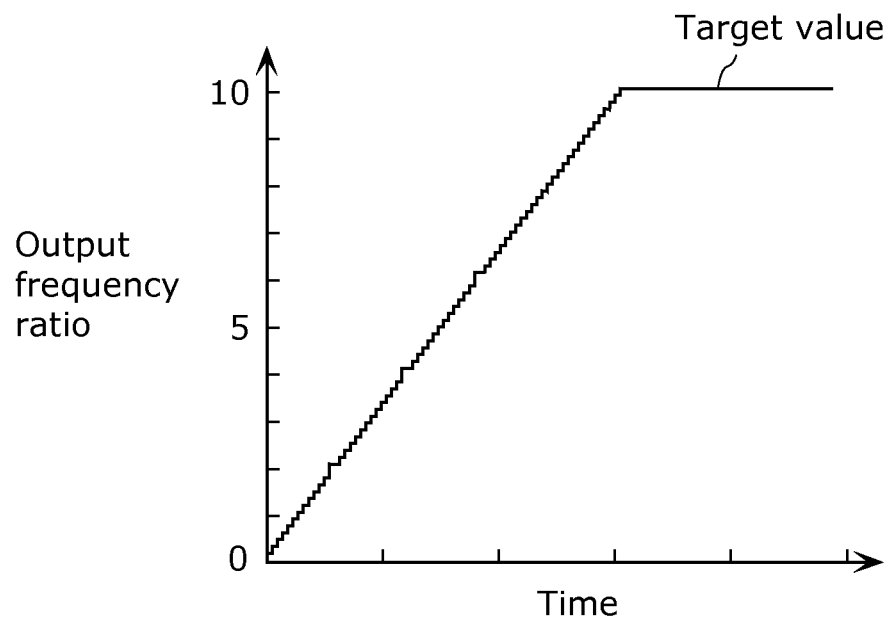
FIG. 16B is a graph illustrating an example of an output frequency ratio according to acceleration control of a power conversion method according to Embodiment 1.

FIG. 16B is a graph illustrating an example of variations of the output frequency ratio with time according to the acceleration control of the present embodiment. According to the acceleration control of the present embodiment, the output frequency fout is discretely increased to allow the output frequency fout to be n×fin/10, where n is an integer from 1 to 100 inclusive except 20, 40, and 60. More specifically, the output frequency ratio is increased from 0.1 to 10 inclusive except 2, 4, and 6, in increments of 0.1. Such processing may be performed in such a manner that when, for example, the value to be set as n for consecutively changing n is one of 20, 40, and 60, a value adjacent to the one of 20, 40, and 60 (e.g., values such as 21, 41, and 61) is set as n instead.

In this case, the offset voltage ratio is substantially 0 at the output voltages with any frequency (cf. FIG. 13 and FIG. 14). Thus, there is no apprehension that stable acceleration of the motor is inhibited.

It is to be noted that the number of steps provided during the acceleration may be less than the number of steps illustrated in FIG. 16B. For example, the output frequency fout may be discretely increased to allow the output frequency fout to be n×fin/10 where n is 10, 21, 30, 41, 50, 61, 70, 80, 90, and 100. As described, it is sufficient as long as n is an integer other than 20, 40, and 60. When n cannot be precisely controlled, the more distant n is from 20, 40, and 60, the more favorable it is.

The method of setting the output frequency has been described above using the stable rotation of the motor as the barometer. However, the use of the power conversion apparatus is not limited to the driving of a motor. Even when the power conversion apparatus is used for converting an input frequency into a specific frequency, it is possible to generate AC output with less distortion without being biased toward a specific voltage.

According to the power conversion apparatus 1 and the power conversion method described above, it is possible to convert the input voltage which is a single-phase AC voltage into a two-phase AC voltage with high efficiency using the matrix switch, without requiring a direct voltage in between.

The two-phase AC voltage obtained by the conversion by the power conversion apparatus 1 is used for, for example, driving the induction motor 5 in which the first axis winding 51 and the second axis winding 52 are not electrically connected. Neither the induction motor 5 nor the power conversion apparatus 1 includes a smoothing capacitor or a starting capacitor that reduces the lifespan and reliability of the apparatus. Thus, combining the induction motor 5 and the power conversion apparatus 1 produces a long-life and highly reliable motor system which does not include a capacitor that reduces the lifespan and reliability of the apparatus.

With the conventional capacitor motor, the resistance of the auxiliary winding used for a start-up is sometimes set larger than that of the main winding. With such a capacitor motor, the torque is limited due to the resistance of the auxiliary winding.

In contrast, the two-phase AC voltage generated by the power conversion apparatus 1 is suitable to be applied to two windings having the same electrical characteristics. Thus, combining the power conversion apparatus 1 and the induction motor 5 which includes the first axis winding 51 and the second axis winding 52 having the same electrical characteristics produces a high-efficiency motor system.

In addition, the following advantageous effect can also be obtained because the single-phase to two-phase conversion by the power conversion apparatus 1 produces output voltages having a large amplitude compared with output voltages produced by a typical single-phase to three-phase conversion.

From comparison between the single-phase to three-phase conversion by a typical matrix converter and the single-phase to two-phase conversion by the power conversion apparatus 1, it was found that the amplitude of the output voltages obtained by the single-phase to two-phase conversion by the power conversion apparatus 1 is $\sqrt{2}$ times larger than the amplitude of the output voltages obtained by the single-phase to three-phase conversion by the typical matrix converter. This means that the two-phase induction motor driven by the output voltages of the power conversion apparatus 1 generates a $\sqrt{2}$-fold torque compared to the three-phase induction motor driven by the output voltages of the typical matrix converter. Thus, if the torque and the volume of the motor (e.g., amount of windings) are in inverse proportion, the two-phase induction motor can generate the same torque with a volume which is $1\sqrt{2}$ (approximately 71%) of that of the three-phase induction motor.

Embodiment 2

The present embodiment describes a control method for making the offset voltage ratio 0 by changing the phase difference between the input voltage and the target voltage when the output frequency ratio is such an output frequency ratio that makes the offset voltage ratio maximal.

Figure 17:
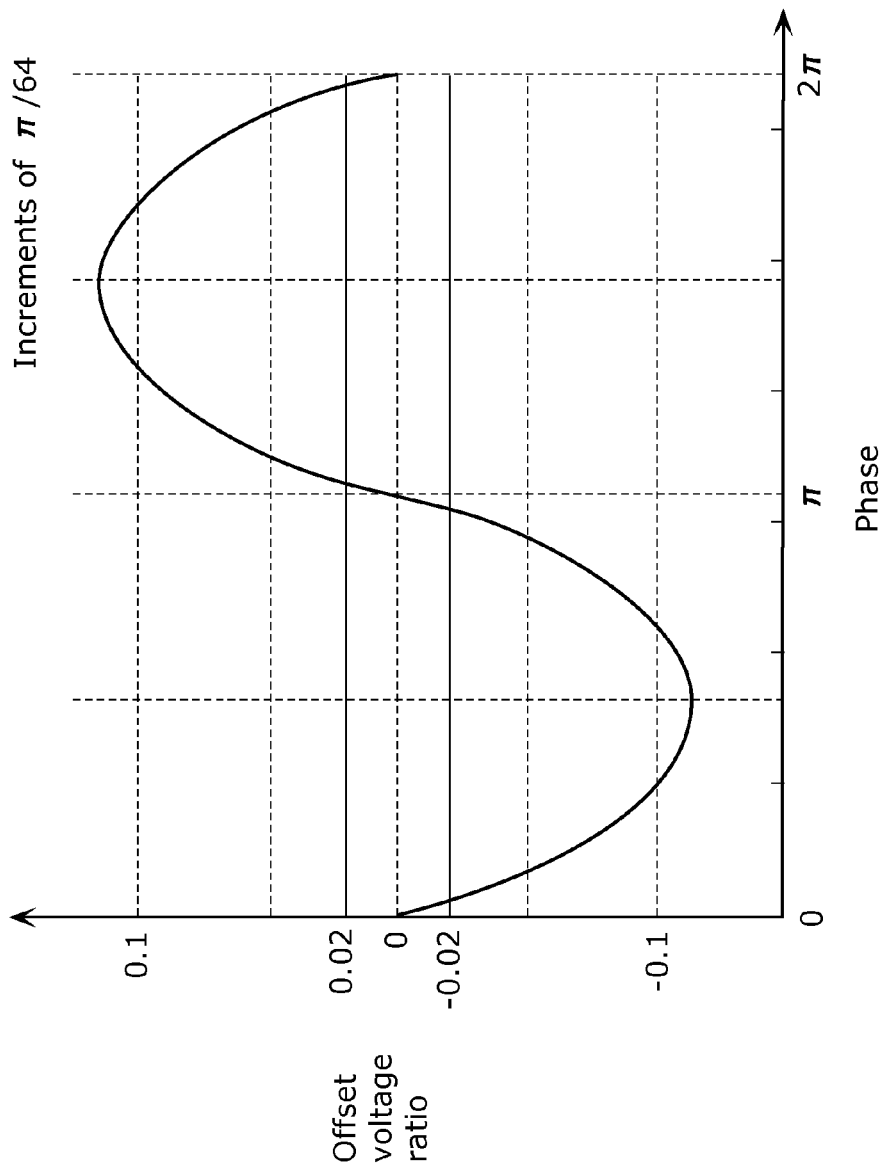
FIG. 17 is a graph illustrating an example of a relationship between an offset voltage ratio and a phase difference between an input voltage and a target voltage of the power conversion apparatus.

FIG. 17 illustrates the offset voltage ratio included in the output voltages when the phase $\theta$ of the target voltage relative to the input voltage is changed to a phase in a range including $\pi/4$ and values other than $\pi/4$, given that the input voltage in is $(\sqrt{2})$ V sin ($\omega$t) and the target voltage ref is V sin ($\omega$t+$\theta$). As can be seen from FIG. 17, the offset voltage ratio takes a local maximal value when the phase $\theta$ is $\pm\pi/2$, and becomes 0 when the phase $\theta$ is 0, $\pi$, and $2\pi$.

In Embodiment 1, in order to rotate the motor in a desired direction, the phase $\theta$ of each of the first target voltage ref1 and the second target voltage ref2 relative to the input voltage is set to $\theta=\pm\pi/4$ to generate a phase difference of $\pi/2$ between the first target voltage ref1 and the second target voltage ref2.

In contrast, when the phase $\theta$ of the first target voltage ref1 relative to the input voltage is set to 0 and a phase difference of $\pi/2$ is given between the first target voltage ref1 and the second target voltage ref2, the phase of the second target voltage ref2 relative to the input voltage becomes $\pi/2$, and the offset voltage ratio takes a local maximal value. Therefore, the second target voltage cannot be applied.

Based on the above results, the motor can be driven at arbitrary consecutive discrete frequencies using the following motor driving method.

Until the frequency of the output voltages becomes a frequency twice the frequency of the input voltage, the first target voltage ref1 is set to V sin ($\omega$t+$\pi/4$) and the second target voltage ref2 is set to V sin ($\omega$t-$\pi/4$). When the frequency of the output voltages is a frequency twice the frequency of the input voltage or greater, the first target voltage ref1 is set to V sin ($\omega$t) and the second bidirectional switches 15 to 18 are all turned OFF. In this case, only the first target voltage having a phase of 0 degrees relative to the input voltage is output, and the second target voltage is not output. Alternatively, the second target voltage ref2 is set to V sin ($\omega$t) and the first bidirectional switches 11 to 14 are all turned OFF. In this case, only the second target voltage having a phase of 0 degrees relative to the input voltage is output, and the first target voltage is not output.

More specifically, given that the output frequency fout is n×fin/10 and n is to be increased to 20 or greater, the phase difference between the input voltage and the first target voltage is set to 0 degrees and the second target voltage is not generated when n is smaller than 20.

Embodiment 3

Introducing a vector control function to the motor system combining the power conversion apparatus 1 and the induction motor described above produces a motor system with higher controllability against fluctuations of an external load placed on the motor. The following describes such a motor system.

Figure 18:
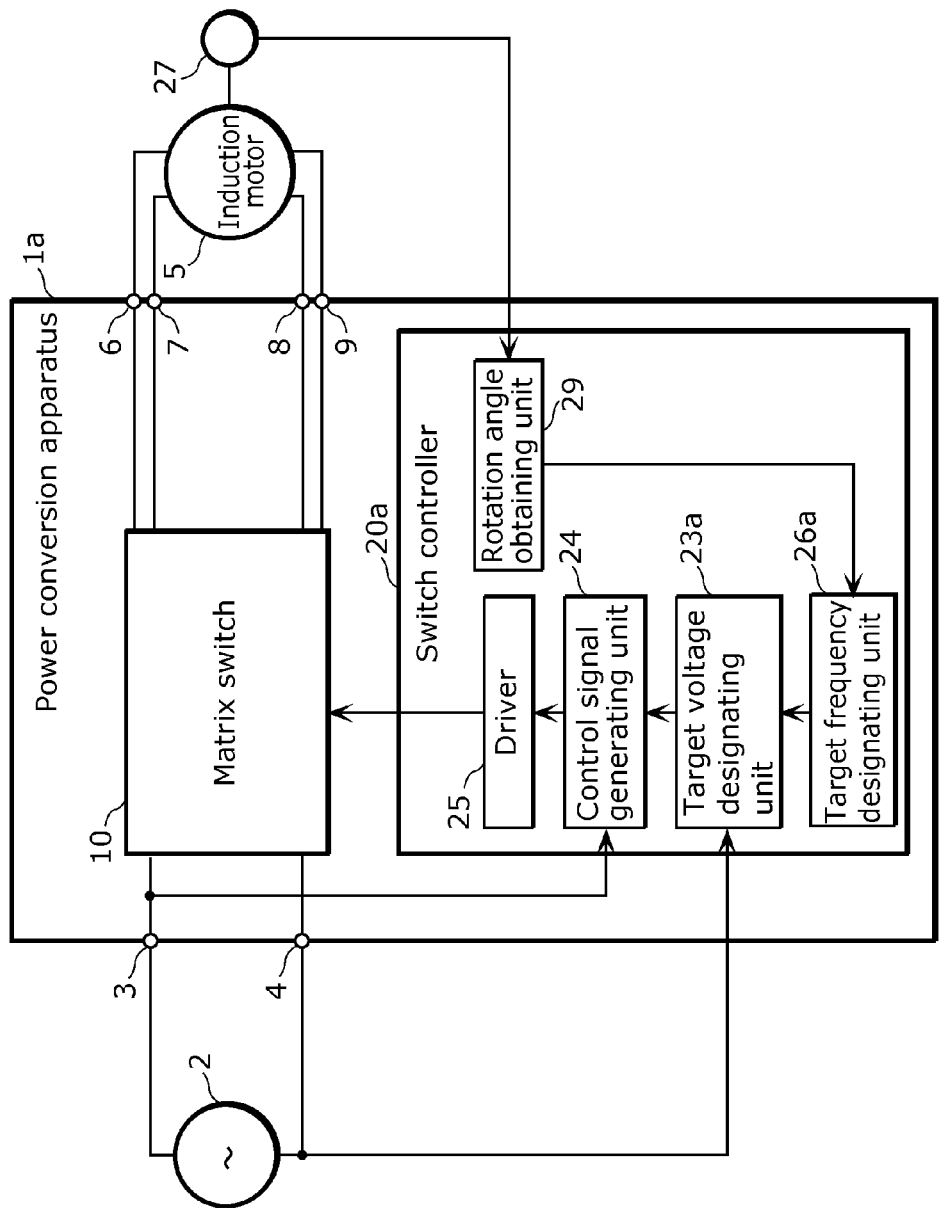
FIG. 18 is a block diagram illustrating another example of a motor system including a power conversion apparatus according to Embodiment 3.

FIG. 18 is a block diagram illustrating an example of a functional configuration of a motor system according to Embodiment 3. In the motor system illustrated in FIG. 18, the induction motor 5 includes a rotation angle sensor 27 which outputs a rotation angle signal indicating consecutive rotation amounts of the rotor. A power conversion apparatus 1a is different from the power conversion apparatus 1 described in Embodiment 1 in that the power conversion apparatus 1a includes a rotation angle obtaining unit 29 and a target frequency designating unit 26a different from the target frequency designating unit 26.

The rotation angle obtaining unit 29 obtains the rotation angle signal output from the rotation angle sensor 27.

The target frequency designating unit 26a changes the frequency of the first target voltage and the second target voltage based on a difference between a rotation speed of the rotor determined from the obtained rotation angle signal and a speed command value.

The target voltage designating unit 23a performs vector control to: change the frequency of the first target voltage and the second target voltage according to the frequency designated by the target frequency designating unit 26a based on the difference between the rotation speed of the rotor determined from the obtained rotation angle signal and the speed command value; and further change at least one of the amplitude and phase of the first target voltage and the second target voltage.

The vector control is specifically maintaining of the excitation current component of the winding current at a constant level, and regulation of the torque current component of the winding current. The power conversion apparatus 1a having the above configuration can control the rotation speed of the rotor by reducing the fluctuations in the rotation speed caused by load fluctuations.

Figure 19:
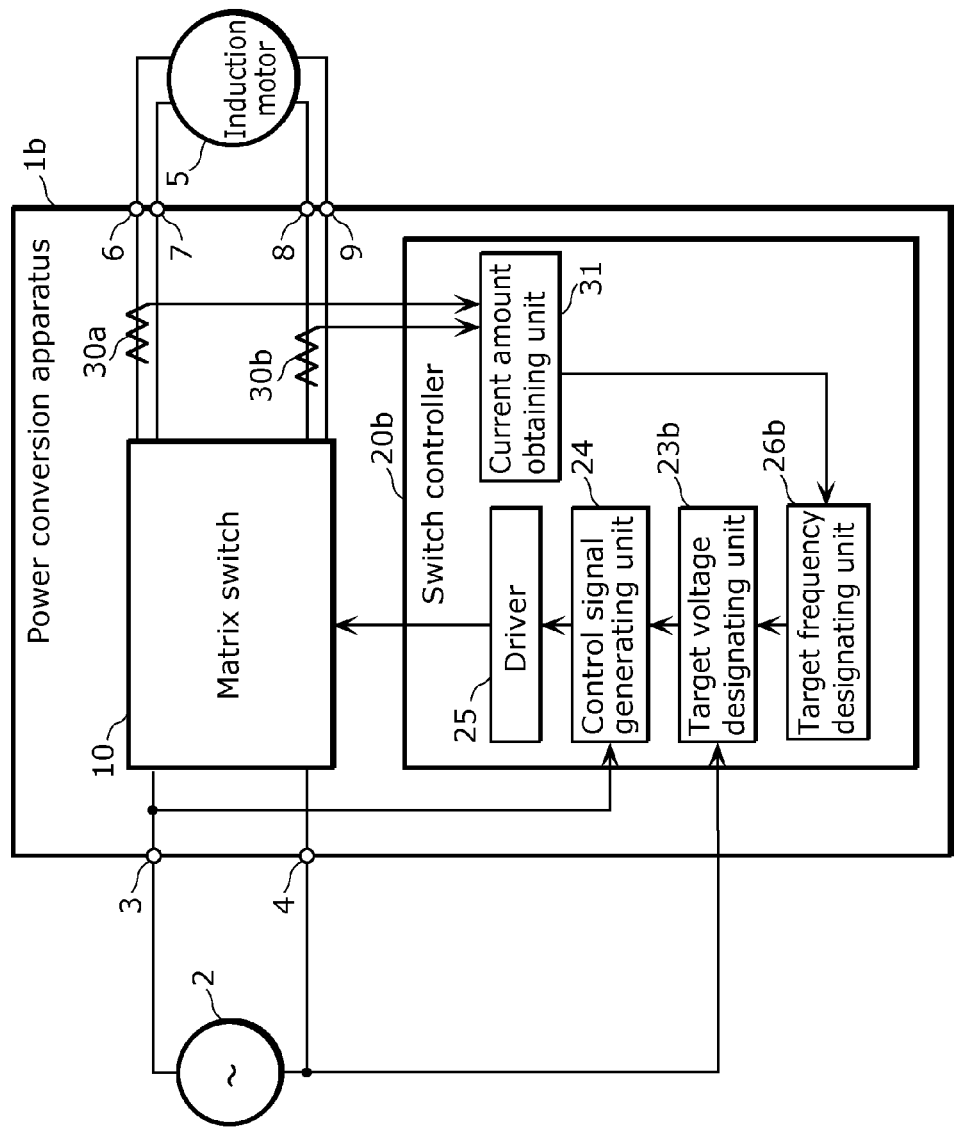
FIG. 19 is a block diagram illustrating still another example of a motor system including a power conversion apparatus according to Embodiment 3.

FIG. 19 is a block diagram illustrating an example of a functional configuration of another motor system according to Embodiment 3. The motor system illustrated in FIG. 19 includes a power conversion apparatus 1b which is different from the power conversion apparatus 1 described in Embodiment 1 in that the power conversion apparatus 1b includes current sensors 30a and 30b, a current amount obtaining unit 31, and a target frequency designating unit 26b different from the target frequency designating unit 26.

The current sensor 30a is a sensor which outputs a current amount signal indicating consecutive current amounts flowing in the pair of the first output terminals 6 and 7, and the current sensor 30b is a sensor which outputs a current amount signal indicating consecutive current amounts flowing in the pair of the second output terminals 8 and 9. The current sensors 30a and 30b may be shunt resistors, for example. The current amount obtaining unit 31 obtains the signals output from the current sensors 30a and 30b. The current sensors 30a and 30b and the current amount obtaining unit 31 are elements included in a current measuring unit.

The target frequency designating unit 26b estimates the rotation speed of the rotor using the obtained consecutive current amounts, and changes the frequency of the first target voltage and the second target voltage based on a difference between the estimated rotation speed and a speed command value.

The target voltage designating unit 23b performs speed sensorless vector control to: change the frequency of the first target voltage ref1 and the second target voltage ref2 according to the frequency designated by the target frequency designating unit 26b based on the difference between the rotation speed of the rotor estimated using the obtained consecutive current amounts and the speed command value; and further change at least one of the amplitude and phase of the first target voltage and the second target voltage.

With the speed sensorless vector control, the rotation speed of the rotor is estimated using a measured value of the winding current, and the torque is controlled using the estimated rotation speed. Since the rotation angle sensor likely to be subject to a constraint on its use environment is not used, the power conversion apparatus 1b is suitable for controlling a motor used in a severe environment (e.g., where large vibrations are present). The power conversion apparatus 1b having the above configuration can control the rotation speed of the rotor by reducing the fluctuations in the rotation speed without using the rotation angle sensor.

The same power conversion method as that described earlier is applicable even when any one or more of the amplitude, frequency, and phase of the first target voltage ref1 and the second target voltage ref2 are changed.

The following describes the method of setting the output frequency when an external load on the motor fluctuates while the vector control or the speed sensorless vector control is performed.

Figure 20A:
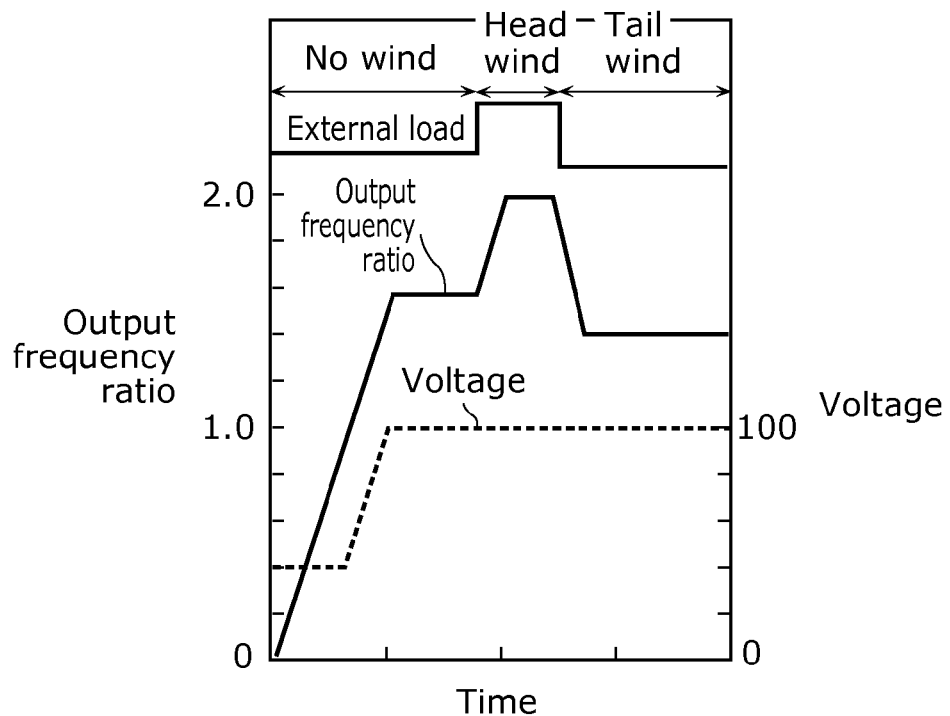
FIG. 20A is a graph illustrating an example of variations of an output frequency ratio with time according to conventional acceleration control.

FIG. 20A is a graph illustrating an example of a conventional method of keeping the rpm constant. As illustrated in FIG. 20A, the rpm of the rotor is kept constant by increasing the torque of the motor through an increase in slip when an external load (e.g., a wind that a ventilating fan receives from outside) increases.

To do so, the output frequency is raised and the output voltages are increased to allow the ratio between the output frequency and the output voltages to be constant. This is called V/F constant control. FIG. 20A illustrates an example of such control resulting in an output frequency ratio of 2.

As described earlier, the output voltages having an output frequency ratio of 2 include an offset voltage having an offset voltage ratio of −0.02.

Figure 20B:
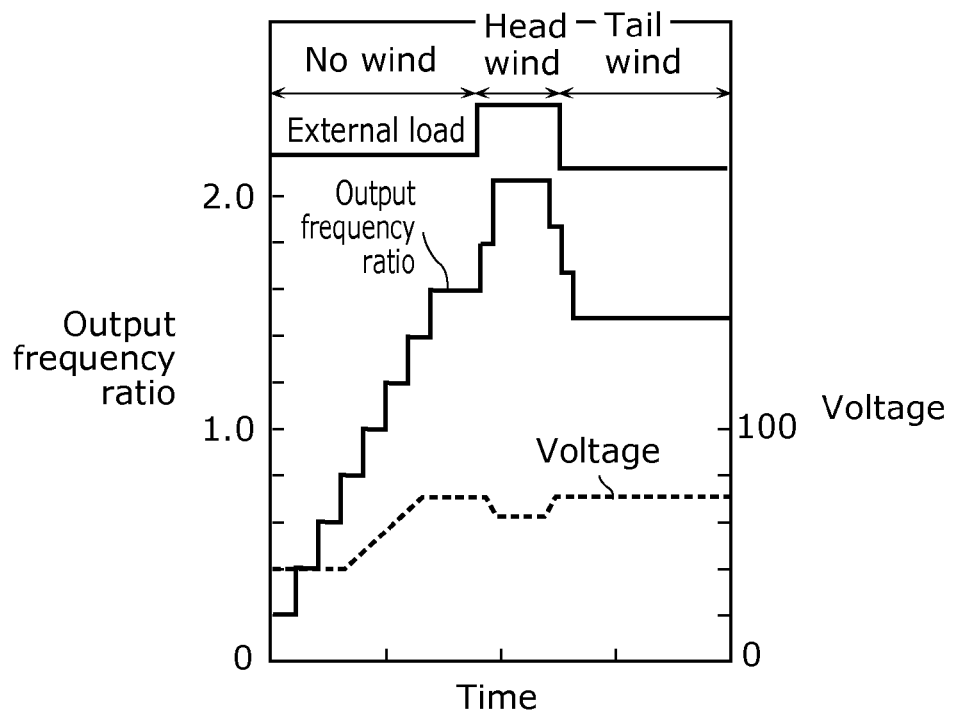
FIG. 20B is a graph illustrating an example of variations of an output frequency ratio with time according to acceleration control by a power conversion method according to Embodiment 3.
Figure 21:
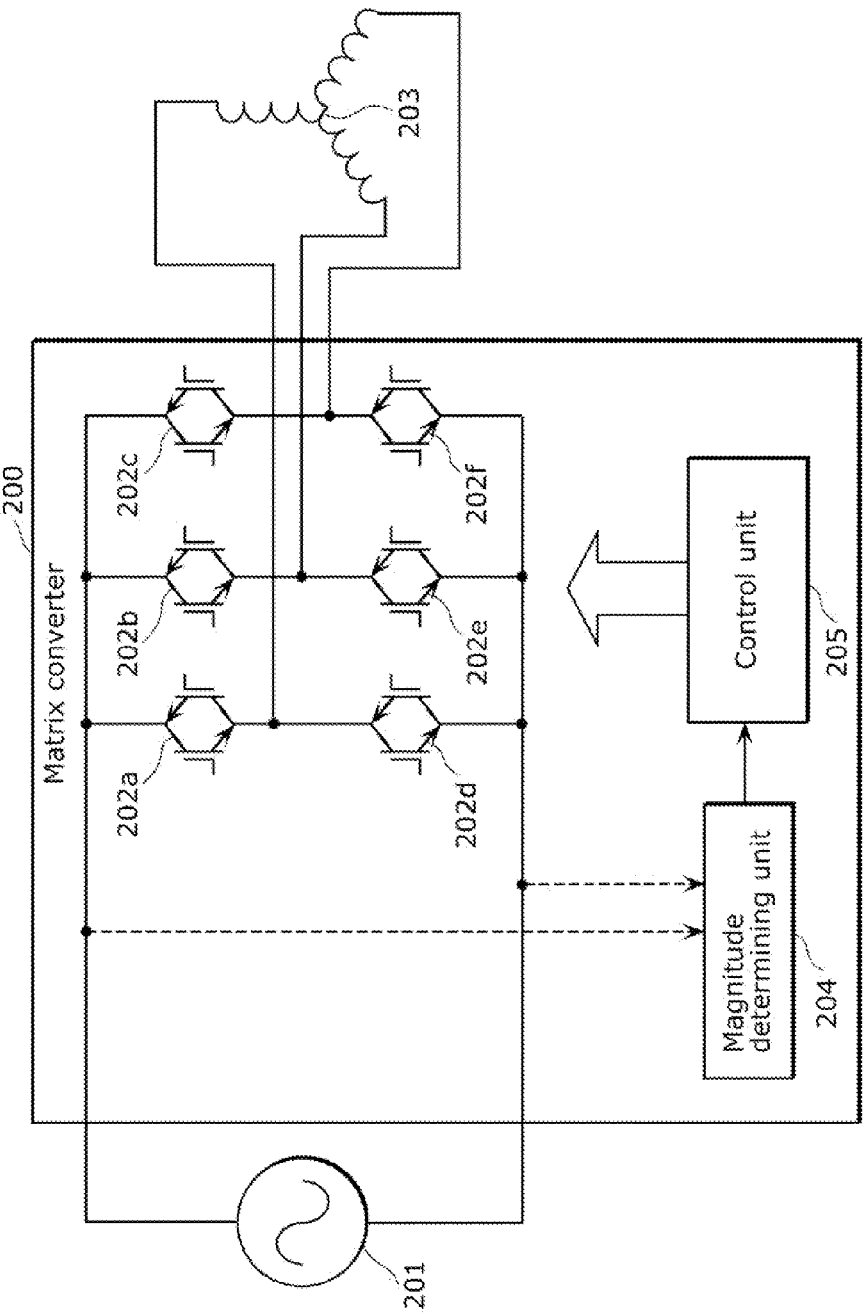
FIG. 21 is a circuit diagram of a conventional matrix converter.
Figure 22:
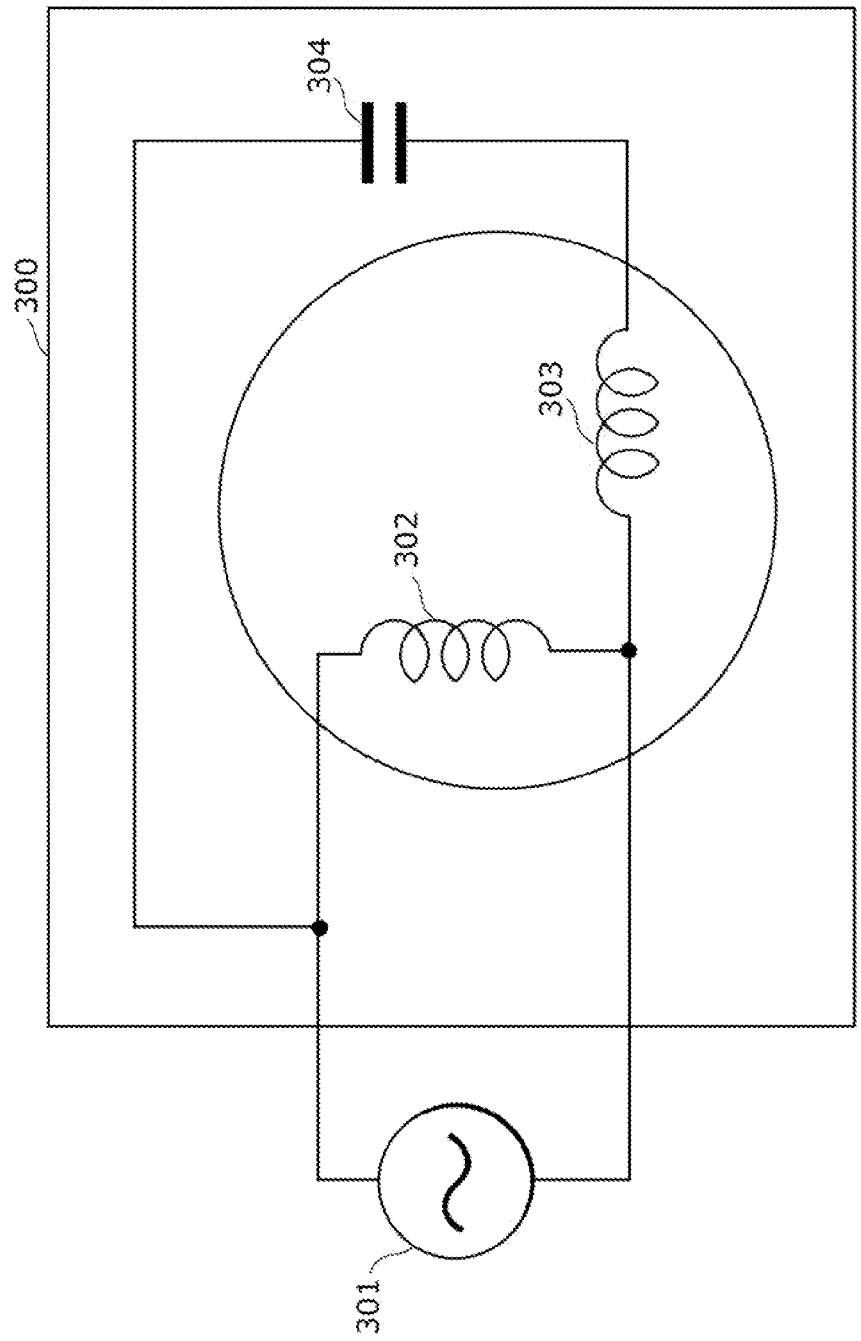
FIG. 22 is a circuit diagram of a conventional capacitor motor.

FIG. 20B is a graph illustrating an example of a method of keeping the rpm constant according to the present embodiment. As illustrated in FIG. 20B, the rpm of the rotor is kept constant by increasing the torque of the motor through an increase in slip when a load torque increases.

To do so, the output frequency is raised as in the conventional method. The frequency to which the output frequency is raised excludes a frequency identified in advance as a frequency at which the output voltages include an offset voltage greater than or equal to a predetermined value.

For example, given an output frequency ratio of 2.1, the output frequency ratio may be set high compared to the conventional method. In this case, the rpm becomes greater than or equal to a target value when the output voltages are increased to keep constant the ratio between the output frequency and the output voltages. In view of this, rather than performing the V/F constant control, the output voltages are decreased to allow the rpm of the motor to be equal to the target rpm. More specifically, the output voltages may be decreased by reducing the duty cycle of the PWM control.

Conversely, given an output frequency ratio of 1.9, the output frequency ratio may be set low compared to the conventional method. In this case, the output voltages may be increased by increasing the duty cycle of the PWM control. In this case, however, it is necessary to take into account the problem of waveforms being distorted if there is no room for the duty cycle of the PWM control to increase. As a result of the above method, the motor can be driven, without being suspended, at constant rpm with no influence from the fluctuations of the load torque.

Such processing may be performed in the following manner: Given that the output frequency fout is n×fin/10 and that n is to be consecutively changed, when a value to be set as n is one of 20, 40, and 60, a value adjacent to the one of 20, 40, and 60 (e.g., 19, 21, 39, 41, 59, 61) is set as n instead, and the voltages designated by the target voltage designating unit 23a or 23b are changed.

Although the power conversion apparatus according to an aspect of the present invention has been described in detail above based on some exemplary embodiments, the present invention is not limited to these embodiments. Those skilled in the art will readily appreciate, without materially departing from the novel teachings and advantages of this invention, that many modifications are possible in the exemplary embodiments, and that different embodiments can be conceived by combining the structural elements of plural embodiments among the above-described exemplary embodiments. Accordingly, all such modifications and embodiments are intended to be included within the scope of this invention.

INDUSTRIAL APPLICABILITY

The present invention is applicable to power conversion apparatuses that convert a single-phase AC power supply into a two-phase AC power supply, and is particularly useful for driving a two-phase induction motor.

REFERENCE SIGNS LIST 1, 1a, 1b Power conversion apparatus
2 Single-phase AC power supply
3, 4 Input terminal 5 Induction motor
6, 7 First output terminal
8, 9 Second output terminal
10 Matrix switch
11, 12, 13, 14 First bidirectional switch
15, 16, 17, 18 Second bidirectional switch
20 Switch controller
23, 23a, 23b Target voltage determining unit
24 Control signal generating unit
25 Driver
26, 26a, 26b Target frequency designating unit
27 Rotation angle sensor
29 Rotation angle obtaining unit
30a, 30b Current sensor
31 Current amount obtaining unit
51 First axis winding
52 Second axis winding
53 Rotor
56, 57 First power receiving terminal
58, 59 Second power receiving terminal
200 Matrix converter
201 Single-phase AC power supply
202a, 202b, 202c, 202d, 202e, 202f Bidirectional switch
203 Three-phase motor
204 Magnitude determining unit
205 Control unit
300 Capacitor motor
301 AC power supply
302, 303 Winding
304 Starting capacitor
M1, M2, M3, M4 IGBT
M5 GaN HFET or GIT
D1, D2 Diode
G1a, G1b, G2a, G2b, G3a, G3b, G4a, G4b First control signal (Gate signal)
G5a, G5b, G6a, G6b, G7a, G7b, G8a, G8b Second control signal (Gate signal)

The invention claimed is:

1. A power conversion method performed by a power conversion apparatus which converts an input voltage which is a single-phase AC voltage into output voltages forming a two-phase AC voltage,
the power conversion method comprising:
designating, using a target voltage designating unit, AC voltages as a first target voltage and a second target voltage, the AC voltages forming a two-phase AC voltage and having (i) an amplitude $1/\sqrt{2}$ times smaller than an amplitude of the input voltage, and (ii) phase differences of +45 degrees and −45 degrees relative to the input voltage; and
designating, using a target frequency designating unit, a frequency other than a frequency twice a frequency of the input voltage, as the frequency of the first target voltage and the second target voltage.

2. The power conversion method according to claim 1, wherein a frequency other than a frequency four times the frequency of the input voltage is designated as the frequency of the first target voltage and the second target voltage, using the target frequency designating unit.

3. The power conversion method according to claim 1, wherein a frequency other than a frequency six times the frequency of the input voltage is designated as the frequency of the first target voltage and the second target voltage, using the target frequency designating unit.

4. The power conversion method according to claim 1, wherein, given that the frequency of the input voltage is fin, a frequency expressed as n×fin/10, where n is a natural number other than 20, 40, and 60, is designated as the frequency of the first target voltage and the second target voltage, using the target frequency designating unit.

5. The power conversion method according to claim 1, wherein, given that the frequency of the input voltage is fin, a frequency expressed as n×fin/10, where n is a natural number, is designated as the frequency of the first target voltage and the second target voltage, using the target frequency designating unit, the designated frequency being a frequency at which a ratio of a simple arithmetic average of at least one of the first target voltage and the second target voltage in one cycle to an absolute value of a peak voltage of the input voltage is in a range from −0.02 to 0.02.

6. The power conversion method according to claim 4, wherein a frequency of the output voltages is increased by increasing n, and the frequency of the output voltages is decreased by decreasing n, using the target frequency designating unit.

7. The power conversion method according to claim 4, wherein, when a value to be set as n is one of 20, 40, and 60, a value adjacent to the one of 20, 40, and 60 is set as n instead, using the target frequency designating unit.

8. The power conversion method according to claim 7, further comprising
changing the voltages designated using the target voltage designating unit, when the value to be set as n using the target frequency designating unit is one of 20, 40, and 60.

9. The power conversion method according to claim 4, wherein, when the value to be set as n using the target frequency designating unit is greater than or equal to 20, (i) a phase difference between the first target voltage and the input voltage is set to one of 0 degrees and 180 degrees, and (ii) generation of the second target voltage is suspended, (i) and (ii) being performed using the target voltage designating unit before the value greater than or equal to 20 is set as n.

10. A power conversion apparatus which converts an input voltage which is a single-phase AC voltage into output voltages forming a two-phase AC voltage, the power conversion apparatus comprising:
a pair of input terminals to which the input voltage is applied;
a pair of first output terminals which output one of the output voltages as a first-phase output voltage;
a pair of second output terminals which output the other of the output voltages as a second-phase output voltage;
four first bidirectional switches each corresponding to a different combination of one of the paired input terminals and one of the paired first output terminals to switch connection and disconnection between the corresponding input terminal and first output terminal according to a corresponding one of first control signals;
four second bidirectional switches each corresponding to a different combination of one of the paired input terminals and one of the paired second output terminals to switch connection and disconnection between the corresponding input terminal and second output terminal according to a corresponding one of second control signals;

a target voltage designating unit configured to designate a first target voltage representing, using one of AC voltages forming a two-phase AC voltage, consecutive target values of the first-phase output voltage and a second target voltage representing, using the other of the AC voltages forming the two-phase AC voltage, consecutive target values of the second-phase output voltage;

a target frequency designating unit configured to designate a frequency of the first target voltage and the second target voltage;

a control signal generating unit configured to (i) generate the first control signals to cyclically connect and disconnect the pair of the input terminals and the pair of the first output terminals via the first bidirectional switches at a duty cycle corresponding to a ratio of an instantaneous absolute value of the first target voltage to an instantaneous absolute value of the input voltage during a time period in which the instantaneous absolute value of the input voltage is greater than the instantaneous absolute value of the first target voltage, and (ii) generate the second control signals to cyclically connect and disconnect the pair of the input terminals and the pair of the second output terminals via the second bidirectional switches at a duty cycle corresponding to a ratio of an instantaneous absolute value of the second target voltage to the instantaneous absolute value of the input voltage during a time period in which the instantaneous absolute value of the input voltage is greater than the instantaneous absolute value of the second target voltage; and a driver which supplies the generated first control signals to the first bidirectional switches and the generated second control signals to the second bidirectional switches, wherein the target voltage designating unit is configured to designate AC voltages as the first target voltage and the second target voltage, the AC voltages forming a two-phase AC voltage and having (i) an amplitude $1/\sqrt{2}$ times smaller than an amplitude of the input voltage, and (ii) phase differences of +45 degrees and −45 degrees relative to the input voltage, and the target frequency designating unit is configured to designate, as the frequency of the first target voltage and the second target voltage, a frequency other than a frequency twice a frequency of the input voltage.

11. The power conversion apparatus according to claim 10, wherein the target frequency designating unit is configured to designate, as the frequency of the first target voltage and the second target voltage, a frequency other than a frequency four times the frequency of the input voltage.

12. The power conversion apparatus according to claim 10, wherein the target frequency designating unit is configured to designate, as the frequency of the first target voltage and the second target voltage, a frequency other than a frequency six times the frequency of the input voltage.

13. A motor system comprising:
the power conversion apparatus according to claim 10;
a two-phase induction motor including: a first axis winding; a second axis winding; a rotor; a pair of first power receiving terminals connected to the first axis winding; and a pair of second power receiving terminals connected to the second axis winding, the first axis winding and the second axis winding being not electrically connected within the two-phase induction motor;

first feed lines connecting the pair of the first output terminals of the power conversion apparatus and the pair of the first power receiving terminals of the two-phase induction motor; and second feed lines connecting the pair of the second output terminals of the power conversion apparatus and the pair of the second power receiving terminals of the two-phase induction motor.

14. The motor system according to claim 13, wherein the two-phase induction motor further includes a rotation angle sensor which outputs a rotation angle signal indicating consecutive rotation amounts of the rotor, the power conversion apparatus further includes a rotation angle obtaining unit configured to obtain the rotation angle signal, the target frequency designating unit is configured to change the frequency of the first target voltage and the second target voltage based on a difference between a rotation speed of the rotor determined from the obtained rotation angle signal and a speed command value, and the target voltage designating unit is configured to perform vector control to change the frequency of the first target voltage and the second target voltage according to the frequency designated by the target frequency designating unit, and further change at least one of an amplitude and a phase of the first target voltage and the second target voltage.

15. The motor system according to claim 13, wherein, given that the frequency of the input voltage applied to the power conversion apparatus is fin, the target frequency designating unit included in the power conversion apparatus is configured to designate a frequency expressed as n×fin/10, where n is a natural number other than 20, 40, and 60, as the frequency of the first target voltage and the second target voltage.

16. The motor system according to claim 13, wherein the power conversion apparatus further includes a current measuring unit configured to measure consecutive current amounts flowing in either the pair of the first output terminals or the pair of the second output terminals, the target frequency designating unit is configured to estimate a rotation speed of the rotor using the measured consecutive current amounts, and change the frequency of the first target voltage and the second target voltage based on a difference between the estimated rotation speed and a speed command value, and the target voltage designating unit is configured to perform speed sensorless vector control to change the frequency of the first target voltage and the second target voltage according to the frequency designated by the target frequency designating unit, and further change at least one of an amplitude and a phase of the first target voltage and the second target voltage.

* * * * *